US008913680B2

(12) United States Patent
Li et al.

(10) Patent No.: US 8,913,680 B2
(45) Date of Patent: Dec. 16, 2014

(54) INTERFERENCE ALIGNMENT METHOD AND DEVICE AND MULTI-CHANNEL COMMUNICATION SYSTEM

(71) Applicant: Huawei Technologies Co., Ltd., Shenzhen (CN)

(72) Inventors: Bin Li, Shenzhen (CN); Yi Luo, Shenzhen (CN); Hui Shen, Shenzhen (CN); Hufei Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 15 days.

(21) Appl. No.: 13/784,182

(22) Filed: Mar. 4, 2013

(65) Prior Publication Data

US 2013/0177097 A1 Jul. 11, 2013

Related U.S. Application Data

(63) Continuation of application No. PCT/CN2011/074718, filed on May 26, 2011.

(30) Foreign Application Priority Data

Sep. 3, 2010 (CN) .......................... 2010 1 0277366

(51) Int. Cl.
| | | |
|---|---|---|
| H04B 7/02 | (2006.01) | |
| H04B 1/62 | (2006.01) | |
| H04B 7/04 | (2006.01) | |
| H04B 7/06 | (2006.01) | |
| H04B 7/08 | (2006.01) | |

(52) U.S. Cl.
CPC ............... *H04B 1/62* (2013.01); *H04B 7/0434* (2013.01); *H04B 7/0617* (2013.01); *H04B 7/0456* (2013.01); *H04B 7/086* (2013.01)
USPC ........................................................ 375/267

(58) Field of Classification Search
CPC .................................................... H04B 7/0871
See application file for complete search history.

(56) References Cited

U.S. PATENT DOCUMENTS

| 7,660,363 B2 * | 2/2010 | Berenguer et al. ............. 375/267 |
| 8,432,990 B2 * | 4/2013 | Tang et al. ..................... 375/267 |

(Continued)

FOREIGN PATENT DOCUMENTS

| CN | 101192869 A | 6/2008 |
| CN | 101783697 A | 7/2010 |
| WO | 2009023681 A2 | 2/2009 |

OTHER PUBLICATIONS

Cadambe, et al., "Interference Alignment and Degrees of Freedom of the K-User Interference Channel," IEEE Transactions on Information Theory, vol. 54, No. 8, Aug. 2008, pp. 3425-3441.
Foreign Communication From a Counterpart Application, PCT Application PCT/CN2011/074718, English Translation of Written Opinion dated Aug. 18, 2011, 3 pages.
Foreign Communication from a Counterpart Application, PCT Application PCT/CN2011/074718, English Translation of the International Search Report, dated Aug. 18, 2011, 3 pages.

*Primary Examiner* — Santiago Garcia
(74) *Attorney, Agent, or Firm* — Conley Rose, P.C.; Grant Rodolph; Nicholas K. Beaulieu

(57) ABSTRACT

An interference alignment method, an interference alignment device, and a multi-channel communication system are provided. The method includes: obtaining channel matrix in a multi-channel communication system; determining a first desired signal and a second desired signal of the multi-channel communication system according to the channel matrix; obtaining precoding vectors and receive vectors, after a first receive signal is filtered by a receive vector corresponding to the first desired signal, a signal formed by superposing interference signals included therein has a feature of a lattice constellation pattern, and that at a receiver corresponding to the second desired signal, after a second receive signal is filtered by a receive vector corresponding to the second desired signal, interference signals included therein are canceled, where the first receive signal and the second receive signal are transmit signals sent to the corresponding receivers after precoding processing is performed at transmitters by using corresponding precoding vectors.

17 Claims, 13 Drawing Sheets

(56) References Cited

U.S. PATENT DOCUMENTS

| | | | |
|---|---|---|---|
| 8,565,064 B2 * | 10/2013 | Tang et al. ............... 370/208 |
| 2007/0201632 A1 * | 8/2007 | Ionescu ............... 379/88.01 |
| 2007/0217537 A1 * | 9/2007 | Berenguer et al. .......... 375/267 |
| 2008/0285524 A1 * | 11/2008 | Yokoyama ............... 370/336 |
| 2009/0122715 A1 | 5/2009 | Lakkis |
| 2009/0274230 A1 * | 11/2009 | Heath et al. ............... 375/260 |
| 2010/0177742 A1 * | 7/2010 | Tang et al. ............... 370/335 |
| 2011/0115675 A1 * | 5/2011 | Sanayei ............... 342/373 |
| 2012/0020423 A1 * | 1/2012 | Reuven et al. ............ 375/260 |
| 2012/0114056 A1 * | 5/2012 | Jafarkhani et al. ......... 375/267 |

* cited by examiner

INTERFERENCE ALIGNMENT METHOD AND DEVICE AND MULTI-CHANNEL COMMUNICATION SYSTEM

CROSS-REFERENCE TO RELATED APPLICATIONS

This application is a continuation of International Application No. PCT/CN2011/074718, filed on May 26, 2011, which claims priority to Chinese Patent Application No. 201010277366.5, filed on Sep. 3, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to mobile communications technologies, and in particular, to an interference alignment method and device and a multi-channel communication system.

BACKGROUND

There are Gaussian interference channels in a wireless communication system. FIG. 1 illustrates Gaussian interference channels of two users. Such Gaussian interference channels may be naturally extended to interference channels of K users. Channels with mutual interference between multiple users are called interference channels. In FIG. 1, x1 and x2 represent signal transmitter, y1 and y2 represent corresponding remote signal receivers, solid arrows represent normal signal transmission, and dotted arrows represent interference that signals at a signal transmitter impose on remote receivers of other signal transmitters. As seen from FIG. 1, for transmit signals at an x1 point, transmit signals at an x2 point are interference sources; certainly, for transmit signals at the x2 point, transmit signals at the x1 point are also interference sources. That is, h12 and h21 are interference channels, resulting in that Tx1 imposes interference on Rx2 and that Tx2 imposes interference on Rx1. In the Gaussian interference channels, mutual interference exists between signals of different users; data cannot be shared between users and cannot be sent jointly, but each user knows a complete channel matrix.

Research shows that an interference alignment method may realize the degree of freedom of a Gaussian interference channel. The interference alignment means that when channel matrixes are already known, desired signals and interference signals at each receiver are separated spatially through preprocessing performed by the transmitters. One of the interference alignment methods in the prior art is as follows: at a receiver, interference from different transmitters is aligned with a space dimension, where the space dimension is different from a space dimension in which desired signals are located, so that interference on the desired signals is avoided. Another interference alignment method in the prior art is as follows: at a receiver, signals formed by superposing interference signals in receive signals filtered by receive vectors can form a lattice constellation pattern.

The inventor discovers that the prior art has at least the following problems: the prior art requires that all interference signals should be aligned in a same direction, where the direction is different from the direction in which desired signals are located; when the aligned interference is close to the desired signals in the space direction, the receiver cancels the interference, but the power of the desired signals becomes smaller and the signal-to-noise ratio of the desired signals at the receiver becomes lower, which makes it difficult to meet actual requirements; for the prior art, the current research shows that in an interference channel with more than two users, it is difficult to implement interference alignment by using a lattice construction method. That is, by using a single one of the two solutions in the prior art, the interference alignment of the multi-channel communication system can hardly achieve optimal performance.

SUMMARY

Embodiments of the present invention provide an interference alignment method and device and a multi-channel communication system, which combine the advantages of two interference alignment solutions in the prior art and avoid their disadvantages to improve the performance of interference alignment.

An embodiment of the present invention provides an interference alignment method, including: obtaining a channel matrix in a multi-channel communication system; determining a first desired signal and a second desired signal of the multi-channel communication system according to the channel matrix, where interference alignment is implemented for the first desired signal by using a lattice construction manner and interference alignment is implemented for the second desired signal by using a beamforming manner; and obtaining precoding vectors and receive vectors, so that at a receiver corresponding to the first desired signal, after a first receive signal is filtered by a receive vector corresponding to the first desired signal, a signal formed by superposing interference signals included therein has a feature of a lattice constellation pattern, and that at a receiver corresponding to the second desired signal, after a second receive signal is filtered by a receive vector corresponding to the second desired signal, interference signals included therein are canceled, where the first receive signal and the second receive signal are transmit signals sent to the corresponding receivers after precoding processing is performed at transmitters by using corresponding precoding vectors.

An embodiment of the present invention provides an interference alignment device, including: a first obtaining module configured to obtain a channel matrix in a multi-channel communication system; a determining module configured to determine a first desired signal and a second desired signal of the multi-channel communication system according to the channel matrix, where interference alignment is implemented for the first desired signal by using a lattice construction manner and interference alignment is implemented for the second desired signal by using a beamforming manner; and a second obtaining module configured to obtain precoding vectors and receive vectors, so that at a receiver corresponding to the first desired signal, after a first receive signal is filtered by a receive vector corresponding to the first desired signal, a signal formed by superposing interference signals included therein has a feature of a lattice constellation pattern, and that at a receiver corresponding to the second desired signal, after a second receive signal is filtered by a receive vector corresponding to the second desired signal, interference signals included therein are canceled, where the first receive signal and the second receive signal are transmit signals sent to the corresponding receivers after precoding processing is performed at transmitters by using corresponding precoding vectors.

An embodiment of the present invention provides a transmitter, including the foregoing interference alignment device and configured to perform precoding processing on transmit signals by using precoding vectors output by the interference alignment device and send the precoded transmit signals.

An embodiment of the present invention provides a multi-channel communication system, including at least two receivers, at least two transmitters, and an interference alignment device. The interference alignment device is configured to obtain precoding vectors and receive vectors, so that at a receiver end corresponding to a first desired signal, after a first receive signal is filtered by a receive vector corresponding to the first desired signal, a signal formed by superposing interference signals included therein has a feature of a lattice constellation pattern, and that at a receiver end corresponding to the second desired signal, after a second receive signal is filtered by a receive vector corresponding to the second desired signal, interference signals included therein are canceled, where interference alignment is implemented for the first desired signal by using a lattice construction manner and interference alignment is implemented for the second desired signal by using a beamforming manner; the transmitters are configured to perform precoding processing on transmit signals by using precoding vectors output by the interference alignment device and send the precoded transmit signals to corresponding receivers; and the receivers are configured to filter corresponding receive signals by using receive vectors output by the interference alignment device and obtain desired signals.

According to the foregoing technical solutions, by using the interference alignment method and device and the multi-channel communication system provided by embodiments of the present invention, precoding vectors and receive vectors are obtained, so that after a first receive signal of a receiver corresponding to a first desired signal is filtered, a signal formed by superposing interference signals included therein has a feature of a lattice constellation pattern, and that after a second receive signal of a receiver corresponding to a second desired signal is filtered, interference signals included therein are canceled, that is, some receive signals are processed by using implementation principles in the first prior art, while some receive signals are processed by using implementation principles in the second prior art. Therefore, advantages of the two prior arts may be combined and their disadvantages may be avoided to achieve optimal system performance.

BRIEF DESCRIPTION OF THE DRAWINGS

To describe the technical solutions in the embodiments of the present invention more clearly, the following briefly introduces the accompanying drawings for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In an interference alignment method in the prior art, interference signals of each desired signal are generally aligned in a same space direction at a receiver. Although multiple interference signals can be mutually aligned, alignment needs to be performed at multiple receivers; this constraint weakens the strength of desired signals projected in an orthogonal direction of interference signals. Therefore, a receive signal-to-noise ratio is relatively poor, thus affecting the improvement of system performance.

The inventor discovers that in this case, performance is reduced at receivers because interference signals and desired signals are generally close spatially. However, in this case, if the spaces of the interference signals and the desired signals can be slightly adjusted and the power of transmitters is adjusted, the interference signals and the desired signals are built into a lattice, which easily separates the interference signals from the desired signals, thereby increasing the receive signal-to-noise ratios of the desired signals and finally improving the system performance.

Figure 1:
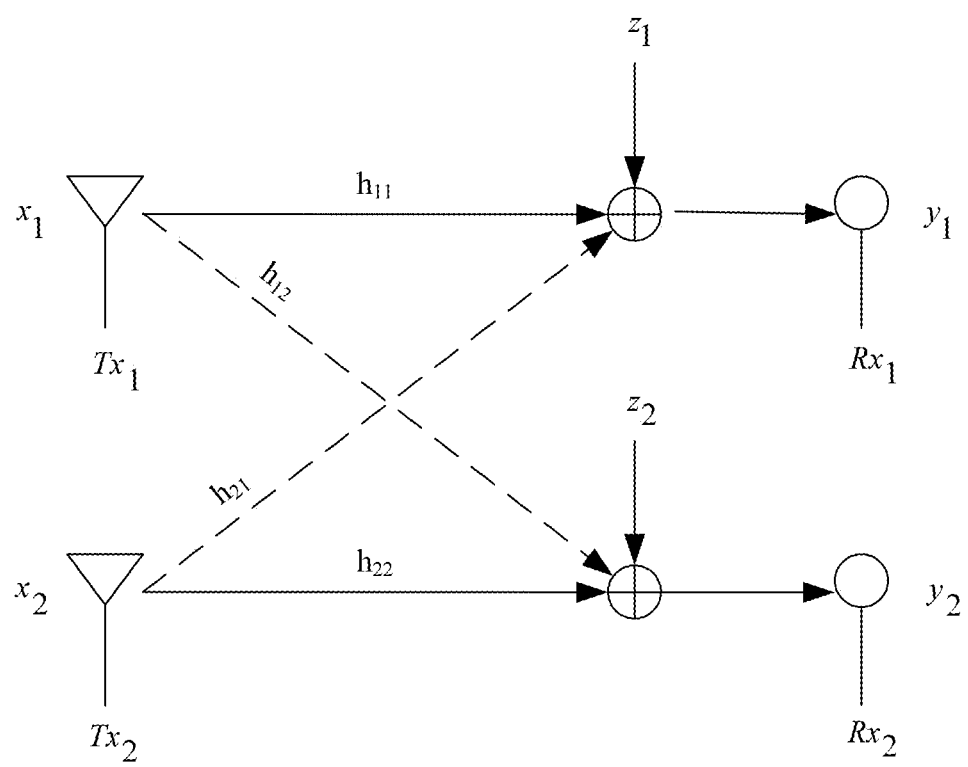
FIG. 1 is a schematic diagram illustrating Gaussian interference in the prior art.
Figure 2:
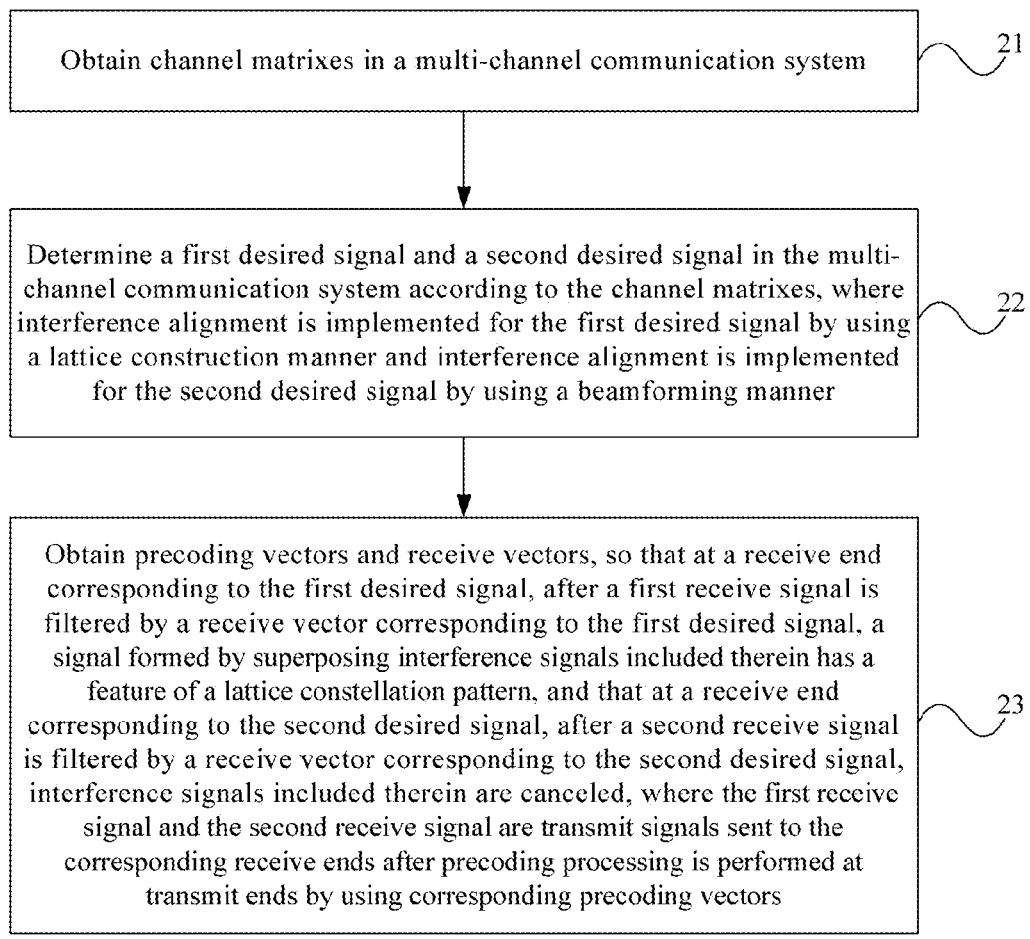
FIG. 2 is a schematic flowchart of an interference alignment method according to Embodiment 1 of the present invention.

FIG. 2 is a schematic flowchart of an interference alignment method according to Embodiment 1 of the present invention. The method may include:

Step 21: Obtain channel matrixes in a multi-channel communication system.

The channel matrixes are represented by H, and the channel matrixes here include channel matrixes where different transmitters correspond to different receivers in the multi-channel communication system.

Step 22: Determine a first desired signal and a second desired signal in the multi-channel communication system according to the channel matrixes, where interference alignment is implemented for the first desired signal by using a lattice construction manner and interference alignment is implemented for the second desired signal by using a beamforming manner.

It should be noted that the first desired signal and the second desired signal represent two different types of desired signals. Specifically, one type of desired signal, that is, the first desired signal, uses a lattice construction manner for interference alignment, and the other type of desired signal, that is, the second desired signal, uses a beamforming manner for interference alignment.

It is understandable that each type of desired signal may include one or more desired signals, and that a specific quantity is determined according to actual applications.

A first desired signal and a second desired signal of the system may be determined by using a principle of maximizing a sum rate. Details may be as follows: sum rates that can be implemented under different combinations of first desired signals and second desired signals are calculated according to the channel matrixes; a first desired signal and a second desired signal corresponding to the maximum sum rate under different combinations of first desired signals and second desired signals are selected as a first desired signal and a second desired signal of the system.

After the first desired signal and the second desired signal of the multi-channel communication system are determined, relative equivalent channel gains $q_{ij}$ of each interference signal relative to the desired signals may be determined. The relative equivalent channel gains in this embodiment of the present invention are a ratio of a minimum Euclidean distance between constellation points of the first desired signal to a minimum Euclidean distance between constellation points of the second desired signal after the first desired signal and the second desired signal are filtered by a receive vector corresponding to the first desired signal.

Step 23: Obtain precoding vectors and receive vectors, so that at a receiver corresponding to the first desired signal, after a first receive signal is filtered by a receive vector corresponding to the first desired signal, a signal formed by superposing interference signals included therein has a feature of a lattice constellation pattern, and that at a receiver corresponding to the second desired signal, after a second receive signal is filtered by a receive vector corresponding to the second desired signal, interference signals included therein are canceled, where the first receive signal and the second receive signal are transmit signals sent to the corresponding receivers after precoding processing is performed at transmitters by using corresponding precoding vectors.

The lattice construction manner here specifically includes: after interference signals are filtered by the receive vectors, superposing the interference signals in a same space direction or two orthogonal space directions, so that the superposed interference signals have a regular constellation pattern, that is, a feature of a lattice constellation pattern. Further, the minimum distance between constellation points is twice greater than the minimum distance between constellation points of the desired signals.

In addition, the precoding vectors and receive vectors may be obtained in the following manner: relative equivalent channel gains of each interference signal corresponding to each first desired signal are determined, and relative equivalent channel gains of interference signals corresponding to each second desired signal are determined to be zero; and the precoding vectors and the receive vectors are determined according to the channel matrixes and the relative equivalent channel gains of the interference signals corresponding to each first desired signal and each second desired signal.

The precoding vectors and the receive vectors may be determined according to the channel matrixes and the relative equivalent channel gains of the interference signals corresponding to each first desired signal and each second desired signal by using an analytical method or an iteration method.

The precoding vectors are used to encode transmit signals at the transmitters, where the transmit signals may be modulated by using a quadrature amplitude modulation (QAM) manner, a quadrature phase shift keying (QPSK) manner, or a binary phase shift keying (BPSK) manner.

The receive vectors are used to filter receive signals at the receivers.

Evidently, by obtaining precoding vectors and receive vectors in this embodiment, some interference signals at the receivers have a feature of a lattice constellation pattern, and some interference signals at the receivers are canceled. In this way, problems caused when all interference signals adopt a single interference alignment manner at the receivers may be avoided, and the system performance is improved.

When the precoding vectors and the receive vectors are calculated, an analytical method and an iteration method may be used. Embodiment 2 and Embodiment 3 of the present invention describe processes of calculating precoding vectors and receive vectors in different systems by using an analytical method. Embodiment 4 of the present invention describes the process of calculating precoding vectors and receive vectors by using an iteration method.

In this embodiment of the present invention, two interference alignment methods in the prior art are combined; on the basis of interference alignment in the first prior art, users are selected on an adaptive basis according to channel conditions to perform signal construction; precoding is performed at the transmitters, and power of the transmitters is adjusted. In this way, signals formed by superposing all interference signals of filtered receive signals can form a lattice constellation pattern, and desired signal information corresponding to each lattice point is unique. In addition, the distance between lattice points is greater than or equal to the Euclidean distance between constellation points of desired signals under an interference-free condition, so that desired signals can be effectively detected and that impacts of interference can be reduced.

After the system implements interference alignment, if desired signals are strongly correlated with interference signals, interference may be canceled by setting $q_{ij}$ to zero, and this may reduce the receive power of the desired signals and reduce the receive signal-to-nose ratios of the desired signals. If a method for forming a lattice at the receivers is used, interference is still superposed with the desired signals after the signals are filtered by the receive vectors, but lattice points are formed (each lattice point includes unique desired signal information). Therefore, the desired signals may be detected without reducing the power of the desired signals, and the system performance is improved.

Figure 3:
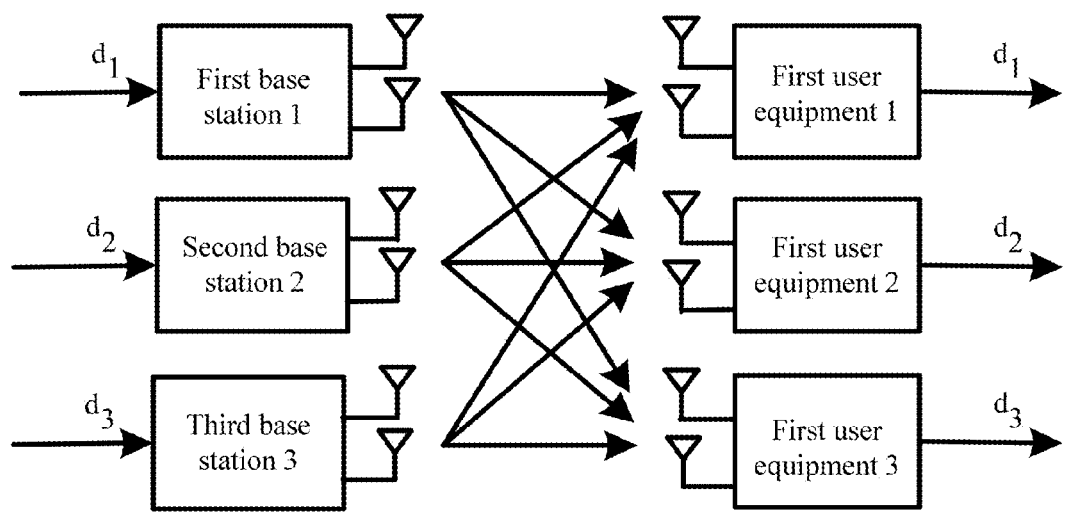
FIG. 3 is a schematic structural diagram of a multi-channel communication system according to Embodiment 2 of the present invention.

FIG. 3 is a schematic structural diagram of a multi-channel communication system according to Embodiment 2 of the present invention. As shown in FIG. 3, Embodiment 2 is based on three transmitters and three receivers. Certainly, the quantity of transmitters or the quantity of receivers is not limited to three, and the multi-channel communication system may be formed by any number of multiple transmitters and multiple receivers. The system in this embodiment includes three base stations and three user equipments. It should be understood that the base stations here are transmitters and the user equipments here are receivers, where each base station has two transmit antennas and each user equipment has two receive antennas. In this embodiment, the signal to be transmitted by a first base station is $d_1$, the signal to be transmitted by a second base station is $d_2$, and the signal to be transmitted by a third base station is $d_3$; the signal desired by a first user equipment is $d_1$, the signal desired by a second user equipment is $d_2$, and the signal desired by a third user equipment is $d_3$; and channel matrixes in the multi-channel communication system are $H_{11}$, $H_{12}$, $H_{13}$, $H_{21}$, $H_{22}$, $H_{23}$, $H_{31}$, $H_{32}$, and $H_{33}$ respectively, which may be understood as channel matrixes where different transmitters correspond to different receivers in the multi-channel communication system.

Figure 4:
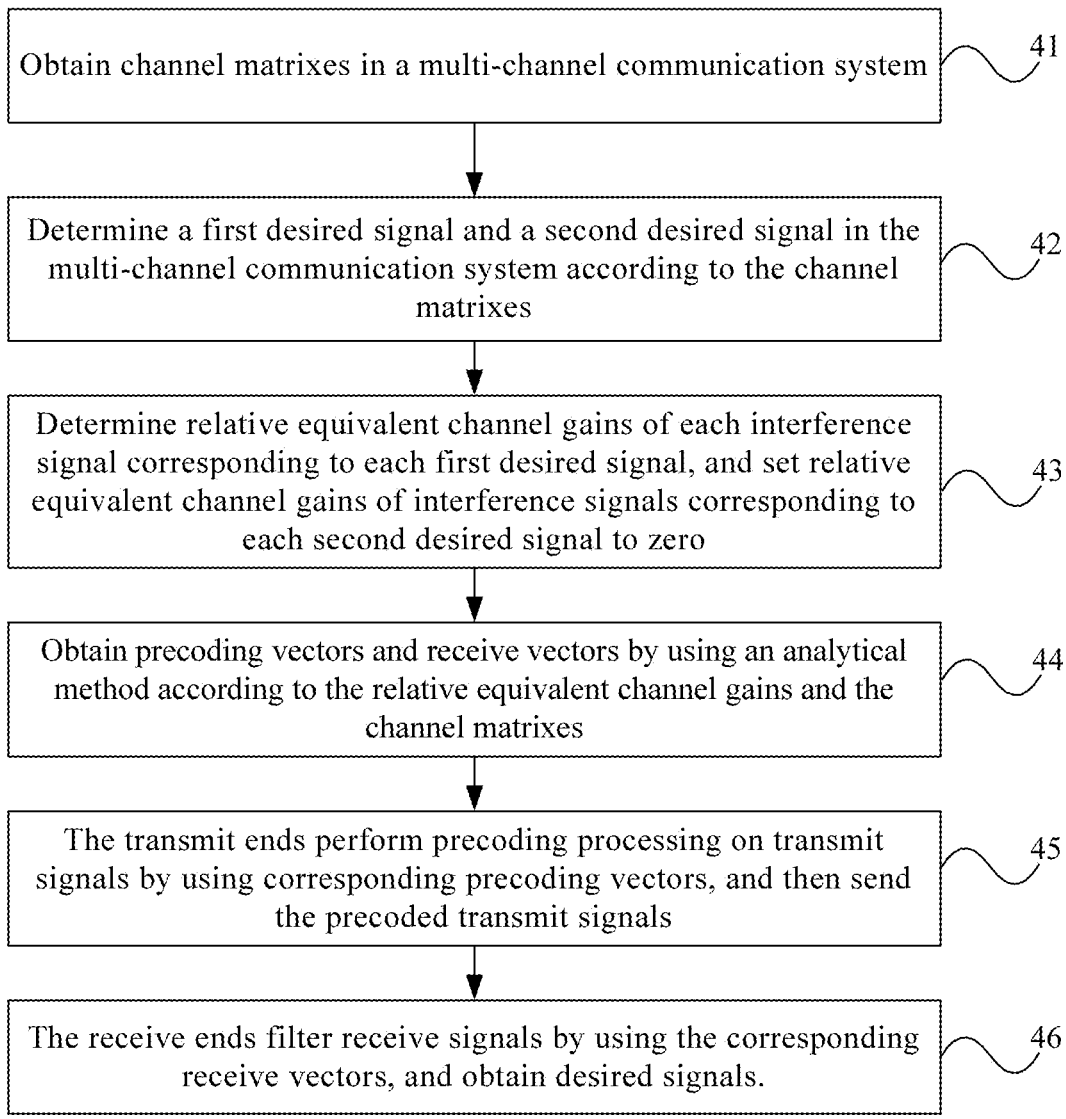
FIG. 4 is a schematic flowchart of an interference alignment method according to Embodiment 2 of the present invention.

FIG. 4 is a schematic flowchart of an interference alignment method according to Embodiment 2 of the present invention. The method may be applied in the system shown in FIG. 3. As shown in FIG. 4, the method may include:

Step 41: Obtain channel matrixes $H_{11}$, $H_{12}$, $H_{13}$, $H_{21}$, $H_{22}$, $H_{23}$, $H_{31}$, $H_{32}$, and $H_{33}$.

Step 42: Determine a first desired signal and a second desired signal in the multi-channel communication system according to the channel matrixes.

It should be noted that the first desired signal and the second desired signal represent two different types of desired signals. Specifically, one type of desired signal, that is, the first desired signal, uses a lattice construction manner for interference alignment, and the other type of desired signal, that is, the second desired signal, uses a beamforming manner for interference alignment.

It is understandable that each type of desired signal may include one or more desired signals, and that a specific quantity is determined according to actual applications.

A first desired signal and a second desired signal may be determined by using the following manner: sum rates that can be implemented under different combinations of first desired signals and second desired signals are calculated according to the channel matrixes; and a first desired signal and a second desired signal corresponding to a maximum sum rate under different combinations of first desired signals and second desired signals are selected as a first desired signal and a second desired signal of the multi-channel communication system.

Step 43: Determine relative equivalent channel gains of each interference signal corresponding to each first desired signal, and set relative equivalent channel gains of interference signals corresponding to each second desired signal to zero.

The relative equivalent channel gain $q_{ij}$ needs to meet the following conditions: $q_{ij}$ is a real number, an imaginary number, or zero and $|q_{ij}|=0$ or $|q_{ij}|\geq 2q_j$, where $q_j$ represents the modulus of the real part or imaginary part of a farthest point in a constellation pattern. In addition, when $|q_{ij}|\geq |q_{kj}|\neq 0$, $|q_{ij}|=|q_{kj}|$ or $|q_{ij}|\geq 2|q_{kj}|$.

$q_{ij}$ represents the equivalent channel gain of the $i^{th}$ stream (an interference signal) relative to the $j^{th}$ stream (a desired signal), for example, in FIG. 3, $q_{21}$ represents the equivalent channel gain of $d_2$ relative to $d_1$. The descriptions may be extended naturally, and are not further repeated here.

The conditions that $q_{ij}$ needs to meet may ensure that after receive signals of some users at the receivers are filtered by receive vectors, these receive signals have a feature of a lattice constellation pattern and that interference signals of some users are aligned in a same space dimension which is different from a space dimension of the desired signals.

For example, the following three cases may exist:

Case 1: At a receiver 1, interference is aligned in a direction and is orthogonal to a receive beam 1, while a lattice is formed at a receiver 2 and a receiver 3. In this case, $q_{21}=q_{31}=0$, $q_{12}=q_{32}$, and $q_{13}=q_{23}$.

Case 2: At a receiver 2, interference is aligned in a direction and is orthogonal to a receive beam 2, while a lattice is formed at a receiver 1 and a receiver 3. In this case, $q_{21}=q_{31}$, $q_{12}=q_{32}=0$, and $q_{13}=q_{23}$.

Case 3: At a receiver 3, interference is aligned in a direction and is orthogonal to a receive beam 3, while a lattice is formed at a receiver 1 and a receiver 2. In this case, $q_{21}=q_{31}$, $q_{12}=q_{32}$, and $q_{13}=q_{23}=0$.

Which one of the foregoing cases exists may be determined after a first desired signal and a second desired signal are determined according to a principle of maximizing a sum rate. For example, when it is determined that the first desired signal is a signal desired by the receiver 1 and that the second desired signal is a signal desired by the receivers 2 and 3, the first case exists, and used relative equivalent channel gains are as follows: $q_{21}=q_{31}=0$, $q_{12}=q_{32}$, and $q_{13}=q_{23}$. Other cases are similar.

Step 44: According to $q_{ij}$ and $H_{11}$, $H_{12}$, $H_{13}$, $H_{21}$, $H_{22}$, $H_{23}$, $H_{31}$, $H_{32}$, and $H_{33}$, obtain precoding vectors $v_1$, $v_2$, and $V_3$ and receive vectors $u_1$, $u_2$, and $u_3$ by using an analytical method.

$$v_n=[v_{n1}v_{n2}]^T, 1\leq n\leq 3; u_m=[u_{m1}, u_{m2}], 1\leq m\leq 3.$$

Specifically, the precoding vectors and receive vectors may be obtained through the following steps:

If a precoding manner is used for transmission, assuming the precoding vectors are $v_1$, $v_2$, and $v_3$ and noise vectors are $n_1$, $n_2$, and $n_3$ (a mean value is 0, and variance is $\sigma_n^2$), the receive signals $R_1$, $R_2$, and $R_3$ are as follows:

$$R_1=H_{11}v_1d_1+H_{21}v_2d_2+H_{31}v_3d_3+n_1$$

$$R_2=H_{12}v_1d_1+H_{22}v_2d_2+H_{32}v_3d_3+n_2$$

$$R_3=H_{13}v_1d_1+H_{23}v_2d_2+H_{33}v_3d_3+n_3 \quad (1)$$

Assuming the receive vectors are $u_1$, $u_2$, and $u_3$, the signals $X_1$, $X_2$, and $X_3$ filtered by the receive vectors are as follows:

$$\begin{cases} X_1 = u_1R_1 \\ X_2 = u_2R_2 \\ X_3 = u_3R_3 \end{cases} \quad (2)$$

To enable the receive signals to form a lattice, the following conditions need to be met:

$$X_1 = u_1 H_{11} v_1 (d_1 + q_{21} d_2 + q_{31} d_3) + u_1 n_1$$

$$X_2 = u_2 H_{22} v_2 (d_2 + q_{12} d_1 + q_{32} d_3) + u_2 n_2$$

$$X_3 = u_3 H_{33} v_3 (d_3 + q_{13} d_1 + q_{23} d_2) + u_3 n_3 \quad (3)$$

To set up formula (3), the following conditions need to be met:

$$\begin{cases} u_1[q_{21} H_{11} v_1 - H_{21} v_2 \quad q_{31} H_{11} v_1 - H_{31} v_3] = 0 \\ u_2[q_{12} H_{22} v_2 - H_{12} v_1 \quad q_{32} H_{22} v_2 - H_{32} v_3] = 0 \\ u_3[q_{13} H_{33} v_3 - H_{13} v_1 \quad q_{32} H_{22} v_2 - H_{32} v_3] = 0 \end{cases} \quad (4)$$

In this embodiment, formula (4) is a constraint equation. Because this constraint equation includes three precoding vectors and six equations in addition to receive vectors, a proper $q_{ij}$ needs to be selected to reduce the order of formula (4), that is, three equations therein need to be equivalent to the other three equations therein, and then v is calculated by using a common algebraic method. For example, v may be obtained according to $q_{ij}$ in the three cases in step 43.

That is, obtaining precoding vectors and receive vectors by using an analytical method according to $q_{ij}$ and H includes: calculating precoding vectors by using a reduced-order constraint equation, where the reduced-order constraint equation includes precoding vectors to be calculated, the relative equivalent channel gains of the interference signals corresponding to each first desired signal and each second desired signal, and channel matrixes, and then calculating receive vectors by using a constraint equation, where the constraint equation includes receive vectors to be calculated, the calculated precoding vectors, the relative equivalent gains of the interference signals corresponding to each first desired signal and each second desired signal, and the channel matrixes.

For example, assuming:

$$\begin{cases} q_{21} = q_{31} = 0 \\ q_{12} = q_{32} \\ q_{13} = q_{23} \end{cases} \quad (5)$$

then:

$$v_2 = H_{23}^{-1} H_{13} v_1$$

$$v_3 = H_{31}^{-1} H_{21} v_2$$

$$v_1 \propto \text{gen. eigenvectors}((H_{23})^{-1} H_{13}, (H_{21})^{-1} H_{31}(H_{32})^{-1} H_{12}),$$

gen. eigenvectors(A,B) represents generalized eigenvectors of matrixes A and B. (6)

In another two cases, similarly, the following may be obtained:

Case 2: $v_1 = H_{13}^{-1} H_{23} v_2; v_3 = H_{32}^{-1} H_{12} v_1$;

$$v_1 \propto \text{gen. eigenvectors}((H_{23})^{-1} H_{13}, (H_{21})^{-1} H_{31}(H_{32})^{-1} H_{12}),$$

gen. eigenvectors(A,B) represents generalized eigenvectors of matrixes A and B. (7)

Case 3: $v_1 = H_{12}^{-1} H_{32} v_3; v_2 = H_{21}^{-1} H_{31} v_3$;

$$v_1 \propto^{\text{gen. eigenvectors}}((H_{23})^{-1} H_{13}, (H_{21})^{-1} H_{31}(H_{32})^{-1} H_{12}),$$

gen. eigenvectors(A,B) represents generalized eigenvectors of matrixes A and B. (8)

After $v_1$, $v_2$, and $v_3$ are calculated through the foregoing derivation process, $v_1$, $v_2$, and $v_3$ are substituted into formula (4), and $u_1$, $u_2$, and $u_3$ may be obtained.

Step 45: The transmitters perform precoding processing on transmit signals by using corresponding precoding vectors, and then send the precoded transmit signals.

Step 46: The receivers filter receive signals by using corresponding receive vectors, and obtain desired signals.

Evidently, in this embodiment, precoding vectors and receive vectors may be obtained by using an analytical method; by using the precoding vectors and the receive vectors, some interference signals at the receivers have a feature of a lattice constellation pattern after being superposed, and some interference signals at the receivers are canceled. In this way, problems caused when all interference signals adopt a single interference alignment manner at the receivers may be avoided, and the system performance is improved.

In this embodiment of the present invention, two interference alignment methods in the prior art are combined; on the basis of interference alignment in the first prior art, users are selected on an adaptive basis according to the channel conditions to perform signal construction; precoding is performed at the transmitters, and power of the transmitters is adjusted. In this way, signals formed by superposing all interference signals of filtered receive signals can form a lattice constellation pattern, and desired signal information corresponding to each lattice point is unique. In addition, the distance between lattice points is greater than or equal to the Euclidean distance between constellation points of desired signals under an interference-free condition, so that desired signals can be effectively detected and that impacts of interference can be reduced.

After the system implements interference alignment, if desired signals are strongly correlated with interference signals, interference may canceled by setting $q_{ij}$ to zero, but this may reduce the receive power of the desired signals and reduce the receive signal-to-nose ratios of the desired signals. If a method for forming a lattice at the receivers is used, interference is still superposed with the desired signals after the signals are filtered by the receive vectors, but lattice points are formed (each lattice point includes unique desired signal information). Therefore, the desired signals may be detected without reducing the power of the desired signals, and the system performance is improved.

Figure 5:
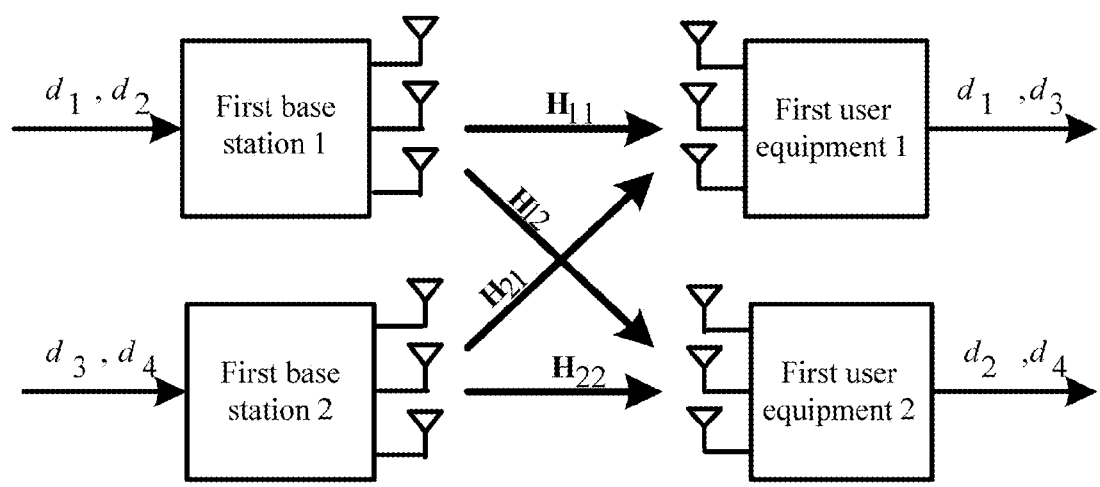
FIG. 5 is a schematic structural diagram of a multi-channel communication system according to Embodiment 3 of the present invention.

FIG. 5 is a schematic structural diagram of a multi-channel communication system according to Embodiment 3 of the present invention. As shown in FIG. 5, the multi-channel communication system includes two base stations and two user equipments. It should be understood that the base stations here are transmitters and the user equipments here are receivers, where each base station has three transmit antennas and each user equipment has three receive antennas. Signals to be transmitted by a first base station are $d_1, d_2$, and signals to be transmitted by a second base station are $d_3, d_4$; signals desired by a first user are $d_1, d_3$, and signals desired by a second user are $d_2, d_4$. Channel matrixes in the multi-channel communication system are $H_{11}$, $H_{12}$, $H_{21}$, $H_{22}$ respectively, which may be understood as channel matrixes where different transmitters correspond to different receivers in the multi-channel communication system.

Figure 6:
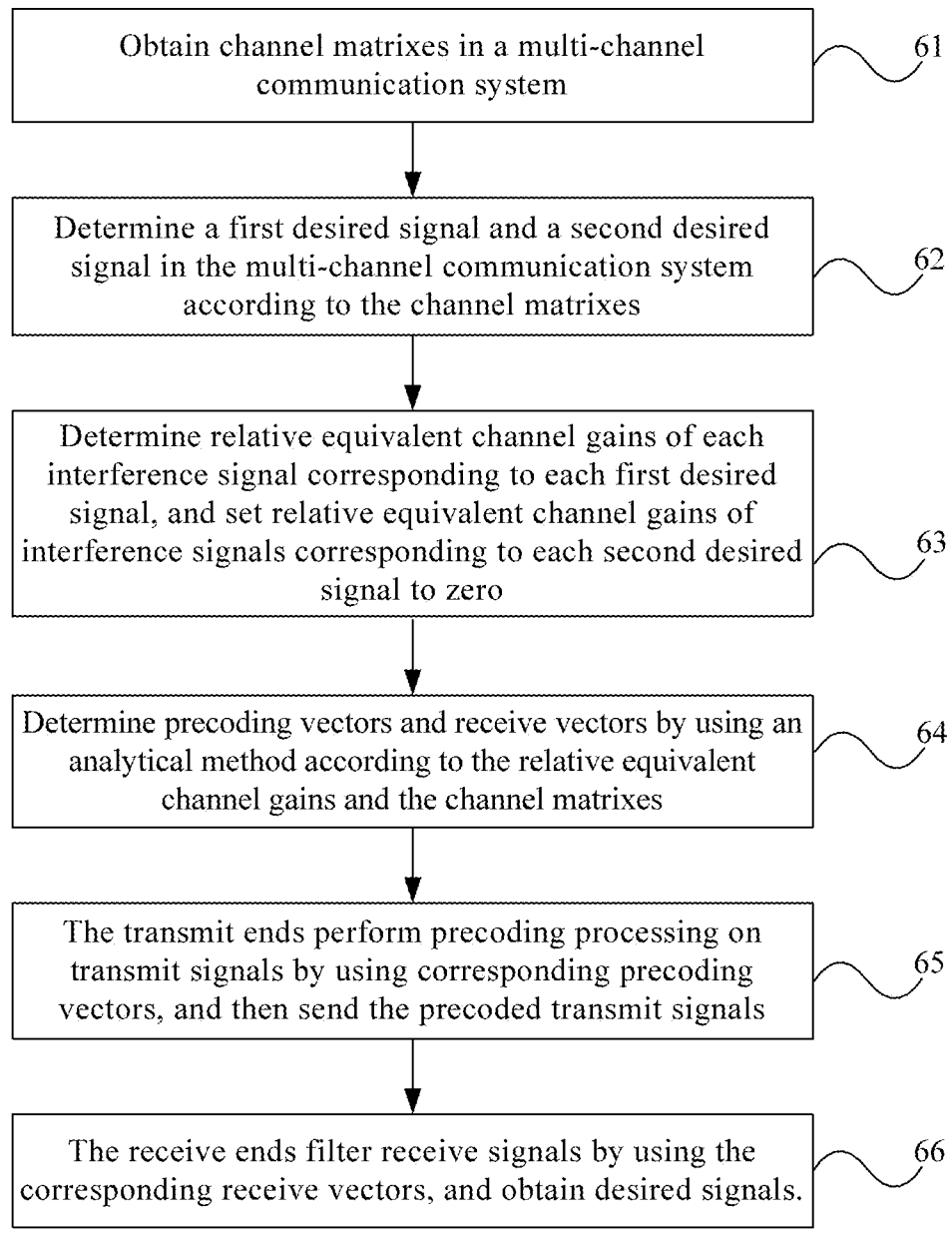
FIG. 6 is a schematic flowchart of an interference alignment method according to Embodiment 3 of the present invention.

FIG. 6 is a schematic flowchart of an interference alignment method according to Embodiment 3 of the present invention. The method may be applied in the system shown in FIG. 5. As shown in FIG. 6, the method may include:

Step 61: Obtain channel matrixes $H_{11}, H_{12}, H_{21}, H_{22}$ in a multi-channel communication system.

Step 62: Determine a first desired signal and a second desired signal in the multi-channel communication system according to the channel matrixes.

It should be noted that the first desired signal and the second desired signal represent two different types of desired signals. Specifically, one type of desired signal, that is, the first desired signal, uses a lattice construction manner for interference alignment, and the other type of desired signal, that is, the second desired signal, uses a beamforming manner for interference alignment.

It is understandable that each type of desired signal may include one or more desired signals, and that the specific quantity is determined according to actual applications.

A first desired signal and a second desired signal may be determined by using the following manner: sum rates that can be implemented under different combinations of first desired signals and second desired signals are calculated according to the channel matrixes; and a first desired signal and a second desired signal corresponding to a maximum sum rate under different combinations of first desired signals and second desired signals are selected as a first desired signal and a second desired signal of the multi-channel communication system.

Step 63: Determine relative equivalent channel gains of each interference signal corresponding to each first desired signal, and set relative equivalent channel gains of interference signals corresponding to each second desired signal to zero.

The relative equivalent channel gain $q_{ij}$ needs to meet the following conditions: $q_{ij}$ is a real number, an imaginary number, or zero and $|q_{ij}|=0$ or $|q_{ij}| \geq 2q_j$, where $q_j$ represents the modulus of the real part or imaginary part of a farthest point in a constellation pattern. In addition, when $|q_{ij}| \geq |q_{kj}| \neq 0$, $|q_{ij}|=|q_{kj}|$ or $|q_{ij}| \geq 2|q_{kj}|$.

$q_{ij}$ represents the equivalent channel gain of the $i^{th}$ stream (an interference signal) relative to the $j^{th}$ stream (a desired signal), for example, in FIG. 5, $q_{21}$ represents the equivalent channel gain of $d_2$ relative to $d_1$. The descriptions may be extended naturally, and are not further repeated here.

The conditions that $q_{ij}$ needs to meet may ensure that after receive signals of some users are filtered by receive vectors, these receive signals have a feature of a lattice constellation pattern and that interference signals of some users are aligned in a same space dimension which is different from a space dimension of the desired signals.

If $q_{ij}$ is not equal to 0 (a lattice is always formed no matter whether $q_{ij}$ is a real number or an imaginary number), it indicates relative equivalent channel gains of each interference signal corresponding to each first desired signal; if $q_{ij}$ is equal to 0, it indicates relative equivalent channel gains of interference signals corresponding to each second desired signal.

FIG. 7A to FIG. 7D illustrate a constellation pattern after receive signals corresponding to different values of $q_{ij}$ are filtered.

Figure 7A:
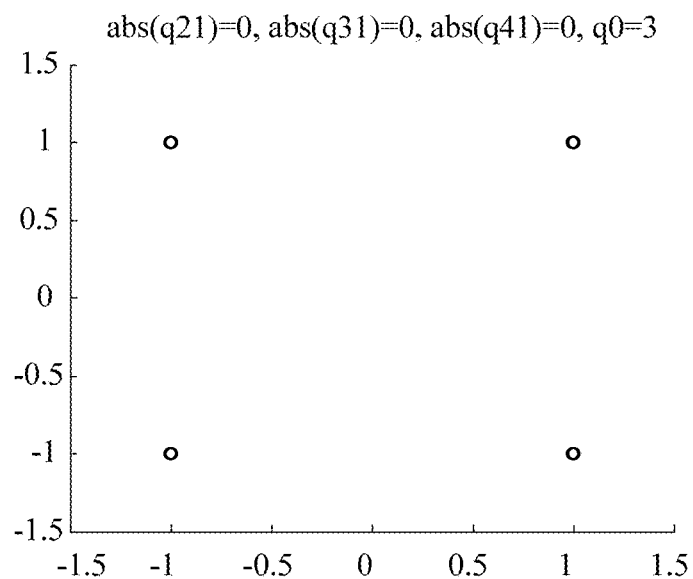
FIG. 7A is a first constellation pattern after a receive signal of a first receiver is filtered according to Embodiment 3 of the present invention.

FIG. 7A is a first constellation pattern after a receive signal of a first receiver is filtered according to Embodiment 3 of the present invention. The preset $q_{ij}$ in this scenario meets the following conditions: abs($q_{21}$)=0, abs($q_{31}$)=0, abs($q_{41}$)=0, and abs($q_0$)=3, where $q_0$ represents a minimum Euclidean distance between constellation points of a desired signal. Four lattice points in FIG. 7A are located at four corner points of a square of which the center is (0, 0) and the side length is equal to 2.

Figure 7B:
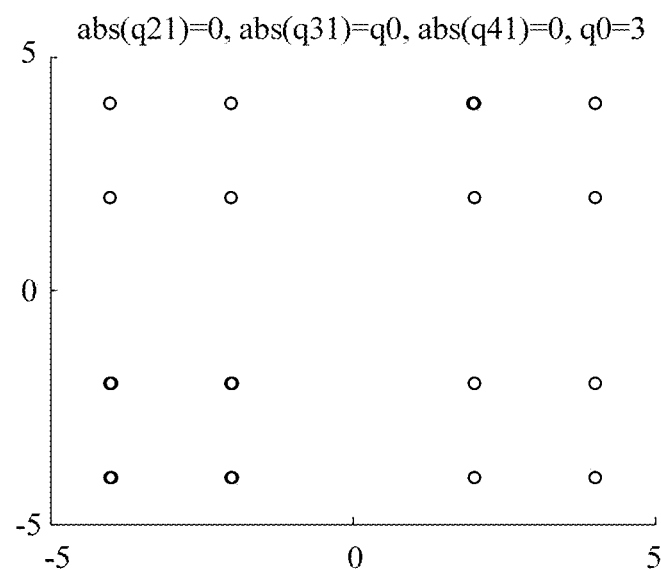
FIG. 7B is a second constellation pattern after a receive signal of a first receiver is filtered according to Embodiment 3 of the present invention.

FIG. 7B is a second constellation pattern after a receive signal of a first receiver is filtered according to Embodiment of the present invention. The preset $q_{ij}$ in this scenario meets the following conditions: abs($q_{21}$)=0, abs($q_{31}$)=q0, abs($q_{41}$)=0, and abs($q_0$)=3. 16 lattice points in FIG. 7B are located at four corner points of four squares respectively, of which the centers are (−3, 3), (3,3), (−3, 3), and (−3, 3) respectively and the side lengths are all equal to 2.

Figure 7C:
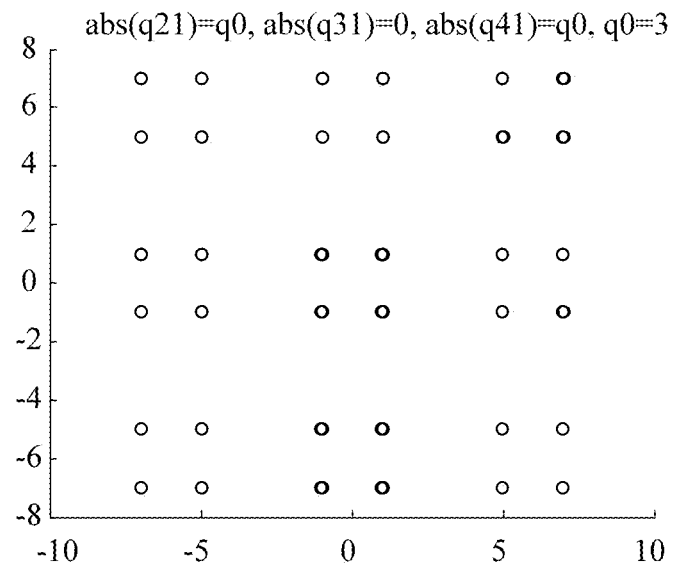
FIG. 7C is a third constellation pattern after a receive signal of a first receiver is filtered according to Embodiment 3 of the present invention.

FIG. 7C is a third constellation pattern after a receive signal of a first receiver is filtered according to Embodiment 3 of the present invention. The preset $q_{ij}$ in this scenario meets the following conditions: abs($q_{21}$)=0, abs($q_{31}$)=q0, abs($q_{41}$)=q0, and abs($q_0$)=3. 36 lattice points in FIG. 7C are located at four corner points of nine squares respectively, of which the centers are (−6, 6), (0, 6), (6, 6), (−6, 0), (0, 0), (6, 0), (−6,−6), (0, −6), and (6, −6) respectively and the side lengths are all equal to 2.

Figure 7D:
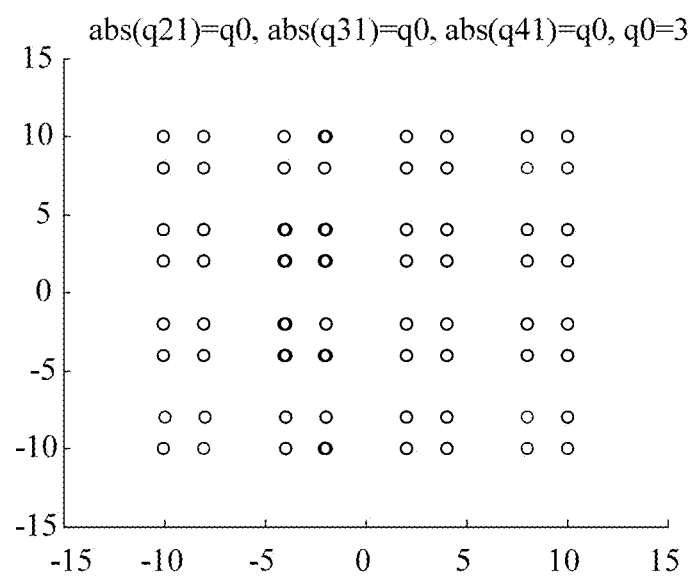
FIG. 7D is a fourth constellation pattern after a receive signal of a first receiver is filtered according to Embodiment 3 of the present invention.

FIG. 7D is a fourth constellation pattern after a receive signal of a first receiver is filtered according to Embodiment 3 of the present invention. The preset $q_{ij}$ in this scenario meets the following conditions: abs($q_{21}$)=q0, abs($q_{31}$)=q0, abs($q_{41}$)= q0, and abs($q_0$)=3. 64 lattice points in FIG. 7D are located at four corner points of 16 squares respectively, of which the centers are (−9, 9), (−3, 9), (3, 9), (9, 9), (−9, 3), (−3, 3), (3, 3), (9, 3), (−9, −3), (−3, 31 3), (3, −3), (9, −3), (−9, −9), (−3, −9), (3, −9), and (9, −9) respectively and the side lengths are all equal to 2.

Step 64: Determine, according to $q_{ij}$ and $H_{11}, H_{12}, H_{21}, H_{22}$, precoding vectors $v_1, v_2, v_3,$ and $v_4$ and receive vectors $u_1, u_2, u_3,$ and $u_4$ by using an analytical method.

$$v_m = [v_{m1} v_{m2} v_{m3}]T, 1 \leq m \leq 4; u_m = [u_{m1}{}^{m2} u_{m3}], 1 \leq m \leq 4.$$

The process of the analytical method includes: calculating precoding vectors by using a reduced-order constraint equation, where the reduced-order constraint equation includes precoding vectors to be calculated, relative equivalent channel gains of the interference signals corresponding to each first desired signal and each second desired signal, and the channel matrixes; and calculating receive vectors by using a constraint equation, where the constraint equation includes receive vectors to be calculated, the calculated precoding vectors, the relative equivalent channel gains of the interference signals corresponding to each first desired signal and each second desired signal, and the channel matrixes.

Specifically, for details about the steps of determining precoding vectors and receive vectors by using an analytical method, reference may be made to the following descriptions:

If a precoding manner is used for transmission, assuming the precoding vectors are $v_1, v_2,$ and $v_3$ and noise vectors are $n_1, n_2,$ and $n_3$, the receive signals $R_1, R_2,$ and $R_3$ are as follows:

$$\begin{cases} R_1 = H_{11}(v_1 d_1 + v_2 d_2) + H_{21}(v_3 d_3 + v_4 d_4) + n_1 \\ R_2 = H_{21}(v_1 d_1 + v_2 d_2) + H_{22}(v_3 d_3 + v_4 d_4) + n_2 \end{cases} \quad (9)$$

Assuming the receive vectors are $u_1, u_2, u_3,$ and $u_4$, the signals $X_1, X_2, X_3,$ and $X_4$ filtered by the receive vectors are as follows:

$$\begin{cases} X_1 = u_1 R_1 \\ X_2 = u_2 R_2 \\ X_3 = u_3 R_1 \\ X_4 = u_4 R_2 \end{cases} \quad (10)$$

To enable the receive signals to form a lattice, the following conditions need to be met:

$$X_1 = u_1 H_{11} v_1 (d_1 + q_{21} d_2 + q_{31} d_3 + q_{41} d_4) + u_1 n_1$$

$$X_2 = u_2 H_{12} v_2 (d_2 + q_{12} d_1 + q_{32} d_3 + q_{42} d_4) + u_2 n_2$$

$$X_3 = u_3 H_{21} v_3 (d_3 + q_{13} d_1 + q_{23} d_2 + q_{43} d_4) + u_3 n_1$$

$$X_4 = u_4 H_{22} v_4 (d_4 + q_{14} d_1 + q_{24} d_2 + q_{34} d_3) + u_4 n_2 \quad (11)$$

In formula (11), $q_{ij}$ represents preset equivalent channel gains of interference channels.

To set up formula (11), the following needs to be met:

$$\begin{cases} u_1[q_{31}H_{11}v_1 - H_{21}v_3 \quad q_{41}H_{11}v_1 - H_{21}v_4 \quad q_{21}H_{11}v_1 - H_{11}v_2] = 0 \\ u_2[q_{32}H_{12}v_2 - H_{22}v_3 \quad q_{42}H_{12}v_2 - H_{22}v_4 \quad q_{12}H_{12}v_2 - H_{12}v_1] = 0 \\ u_3[q_{13}H_{21}v_3 - H_{11}v_1 \quad q_{23}H_{21}v_3 - H_{11}v_2 \quad q_{43}H_{21}v_3 - H_{21}v_4] = 0 \\ u_4[q_{14}H_{22}v_4 - H_{12}v_1 \quad q_{14}H_{22}v_4 - H_{12}v_2 \quad q_{34}H_{22}v_4 - H_{22}v_3] = 0 \end{cases} \quad (12)$$

Because each user has only three receive antennas, two items in each line of formula (12) need to be equal, for example:

$$\begin{cases} q_{41}H_{11}v_1 - H_{21}v_4 = q_{21}H_{11}v_1 - H_{11}v_2 \\ q_{32}H_{12}v_2 - H_{22}v_3 = q_{12}H_{12}v_2 - H_{12}v_1 \\ q_{23}H_{21}v_3 - H_{11}v_2 = q_{43}H_{21}v_3 - H_{21}v_4 \\ q_{14}H_{22}v_4 - H_{12}v_1 = q_{34}H_{22}v_4 - H_{22}v_3 \end{cases} \quad (13)$$

If formula (13) is substituted into formula (12), formula (14) below is obtained:

$$\begin{cases} u_1[q_{31}H_{11}v_1 - H_{21}v_3 \quad q_{21}H_{11}v_1 - H_{11}v_2] = 0 \\ u_2[q_{32}H_{12}v_2 - H_{22}v_3 \quad q_{42}H_{12}v_2 - H_{22}v_4] = 0 \\ u_3[q_{13}H_{21}v_3 - H_{11}v_1 \quad q_{23}H_{21}v_3 - H_{11}v_2] = 0 \\ u_4[q_{14}H_{22}v_4 - H_{12}v_1 \quad q_{14}H_{22}v_4 - H_{12}v_2] = 0 \end{cases} \quad (14)$$

In this embodiment, formula (14) is a constraint equation. Order reduction may be performed on formula (14) by using the processing manner in the embodiment shown in FIG. 4, so that the order-reduced constraint equation includes precoding vectors to be calculated, the relative equivalent channel gains of the interference signals corresponding to each first desired signal and each second desired signal, and the channel matrixes, but does not include receive vectors, so that precoding vectors are calculated. Then, receive vectors are calculated according to the calculated precoding vectors and the constraint equation.

For example, $$\text{Assuming} \begin{cases} q_{41} = q_{21} \\ q_{32} = q_{12} \\ q_{23} = q_{43} \\ q_{14} = q_{34} \end{cases} \quad (15)$$

then, $$\begin{cases} H_{12}v_1 = H_{22}v_3 \\ H_{11}v_2 = H_{21}v_4 \end{cases}$$

According to formulas (14) and (15), $(u_1, u_2, u_3, u_4)$ and $(v_1, v_2, v_3, v_4)$ may be obtained.

Step 65: The transmitters encode transmit signals by using corresponding precoding vectors, and then send the encoded transmit signals.

Step 66: The receivers filter receive signals by using corresponding receive vectors, and obtain desired signals.

Evidently, in this embodiment, precoding vectors and receive vectors may be obtained by using an analytical method; by using the precoding vectors and the receive vectors, some interference signals at the receivers have a feature of a lattice constellation pattern, and some interference signals at the receivers are canceled. In this way, problems caused when all interference signals adopt a single interference alignment manner at the receivers may be avoided, and the system performance is improved.

Under some system configurations, it is difficult to precode vectors and receive vectors by using an analytical method. In this case, a ratio of the sum of power of desired signals to the sum of power of interference that interference signals impose on desired signals may be used as an optimization goal function to perform iterative calculation, and precoding vectors and receive vectors are calculated by maximizing the ratio of the sum of the power of desired signals to the sum of power of interference that interference signals impose on desired signals.

Figure 8:
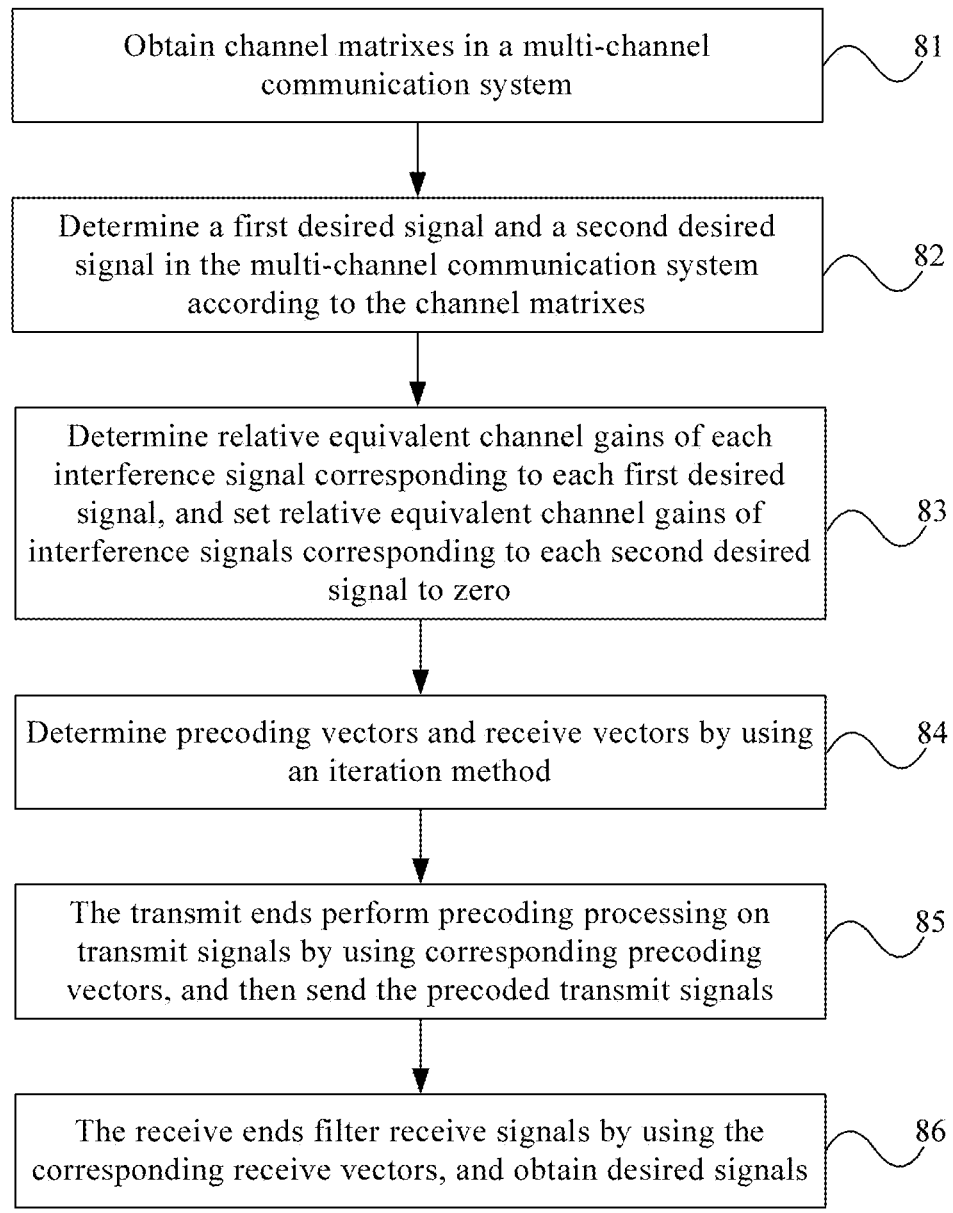
FIG. 8 is a schematic flowchart of an interference alignment method according to Embodiment 4 of the present invention.

FIG. 8 is a schematic flowchart of an interference alignment method according to a fourth embodiment of the present invention, including:

Step 81: Obtain channel matrixes in a multi-channel communication system.

Different channel matrixes may be obtained according to different system structures, for example, the channel matrixes illustrated in Embodiment 2 or Embodiment 3.

Step 82: Determine a first desired signal and a second desired signal in the multi-channel communication system according to the channel matrixes.

For details, reference may be made to the determining method illustrated in Embodiment 2 or Embodiment 3.

Step 83: Determine relative equivalent channel gains of each interference signal corresponding to each first desired signal, and set relative equivalent channel gains of interference signals corresponding to each second desired signal to zero. For details about conditions that $q_{ij}$ needs to be met, reference may be made to Embodiment 2 or Embodiment 3.

Step 84: Determine, according to the relative equivalent channel gains of the interference signals corresponding to each first desired signal and each second desired signal and the channel matrixes, precoding vectors and receive vectors by using an iteration method.

The process of the iteration method is as follows:

Precoding vectors are calculated by using an optimization method, by using receive vectors generated at random as initial values of input of an iteration and using a sum of power of interference that interference signals impose on desired signals at a receiver as an optimization goal or using a ratio of a sum of strength of desired signals to a sum of power of interference that interference signals impose on desired signals at the receiver as an optimization goal, where the sum of power of interference that interference signals impose on desired signals at the receiver or the ratio of the sum of strength of desired signals to the sum of power of interference that interference signals impose on desired signals at the receiver is generated according to the relative equivalent channel gains of the interference signals corresponding to each first desired signal and each second desired signal and the channel matrixes. The optimization method includes but is not limited to a minimum mean square estimation method, a convex optimization, minimum signal-to-noise ratio method, and a zero-forcing method.

Receive vectors are calculated according to the calculated precoding vectors by using a maximum signal-to-noise ratio as the optimization goal or by using a minimum mean square estimation (MMSE) method, and used as input of a next iteration, where the signal-to-noise ratio is generated according to the relative equivalent channel gains of the interference signals corresponding to each first desired signal and each second desired signal and the channel matrixes.

The foregoing steps are repeated until the preset number of iterations is reached, and precoding vectors and receive vectors after the iteration are obtained.

Figure 9:
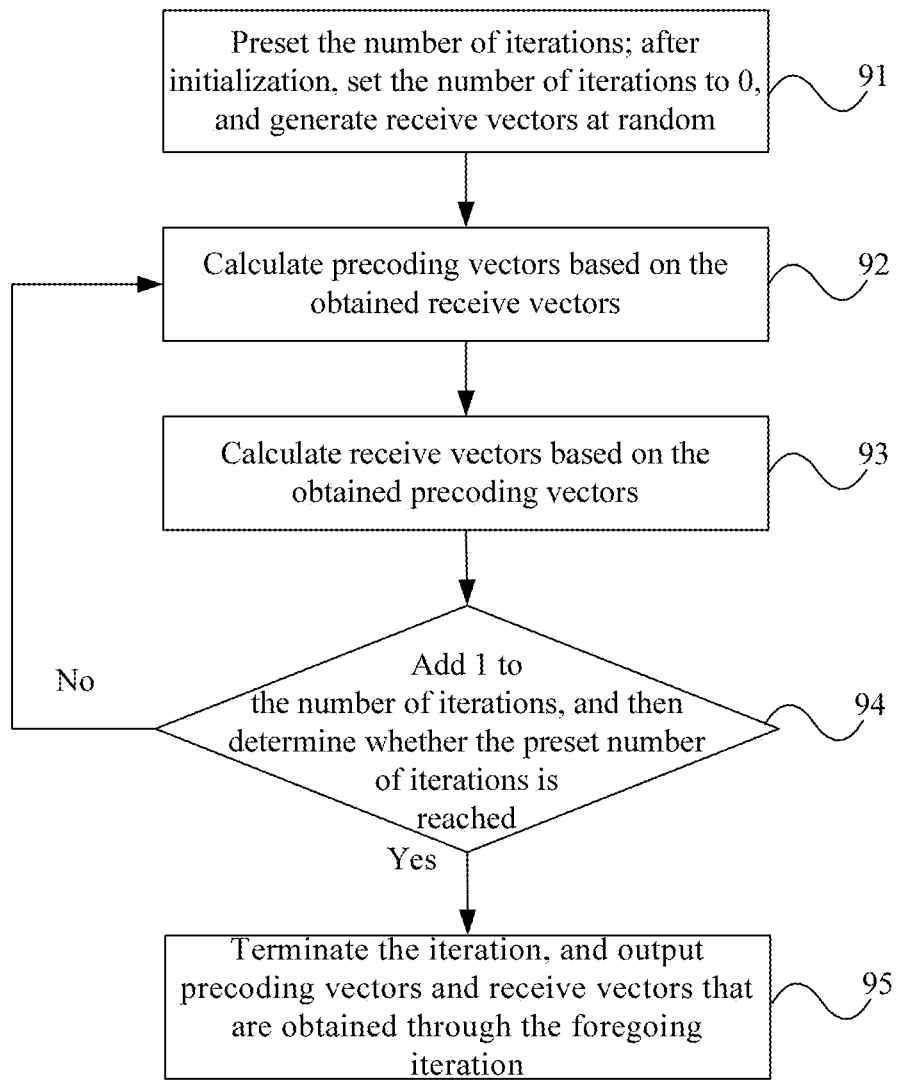
FIG. 9 is a schematic flowchart of a method for obtaining precoding vectors and receive vectors by using an iteration method according to Embodiment 3 of the present invention.

Specifically, FIG. 9 is a schematic flowchart of a method for determining precoding vectors and receive vectors by using an iteration method according to Embodiment 3 of the present invention, including:

Step 91: Preset the number of iterations; after initialization, set the number of iterations to 0, and generate receive vectors at random.

Taking the system in Embodiment 2 as an example, $u_1$, $u_2$, and $u_3$ are generated at random.

Step 92: Calculate precoding vectors by using an optimization method, based on the obtained receive vectors (receive vectors generated at random in the first iteration, and receive vectors obtained in a previous iteration after the iteration) and by using a sum of power of interference that interference signals impose on desired signals at a receiver as an optimization goal or by using a ratio of a sum of strength of desired signals to a sum of power of interference that interference signals impose on desired signals at the receiver as an optimization goal.

For example, interference channel matrixes $H_{int}$, channel matrixes $H_{sig}$, of the desired signals, and a total transmit signal vector V are constructed firstly:

$$H_{int} = \begin{bmatrix} q_{21}u_1H_{11} & -u_1H_{21} & 0 \\ q_{31}u_1H_{11} & 0 & -u_1H_{31} \\ -u_2H_{12} & q_{12}u_2H_{22} & 0 \\ 0 & q_{32}u_2H_{22} & -u_2H_{32} \\ -u_3H_{13} & 0 & q_{13}u_3H_{33} \\ 0 & -u_3H_{23} & q_{23}u_3H_{33} \end{bmatrix}$$

$$H_{sig} = [u_1H_{11} \quad u_2H_{22} \quad u_3H_{33}]$$

$$V = \begin{bmatrix} v_1 \\ v_2 \\ v_3 \end{bmatrix}$$

If the sum of power of interference that interference signals impose on desired signals is used as the optimization goal, $H_{int}V$ is minimized to calculate V, so as to obtain corresponding precoding vectors.

If the ratio of the sum of strength of desired signals to the sum of power of interference that interference signals impose on desired signals at the receiver is used as the optimization goal, the SLR or SLNR is maximized to calculate V, where:

$$SLR = \frac{|H_{sig}V|^2}{|H_{int}V|^2}$$

$$SLNR = \frac{|H_{sig}V|^2}{|H_{int}V|^2 + \sigma_n^2}$$

Step 93: Calculate receive vectors by using the precoding vectors obtained in step 92 and using a maximum signal-to-noise ratio as the optimization goal or using the MMSE method.

If the MMSE method is used, the interference $u_i[q_{ji}H_{ii}v_i - H_{ji}v_j]$ that an interference signal j imposes on a desired signal i needs to be minimized to obtain receive vectors.

If the maximum signal-to-noise ratio is used as the optimization goal, the $SIR_i$ or the $SINR_i$ is maximized, where:

$$SIR_i = \frac{|u_iH_{ii}v_i|^2}{\sum_{j \neq i} |u_i(q_{ji}H_{ii}v_i - H_{ji}v_j)|^2}$$

$$SINR_i = \frac{|u_iH_{ii}v_i|^2}{\sum_{j \neq i} |u_i(q_{ji}H_{ii}v_i - H_{ji}v_j)|^2 + \sigma_n^2}$$

Step 94: Add 1 to the number of iterations, and then determine whether the number of iterations reaches the preset number; if yes, execute step 95; otherwise, repeat step 92.

Step 95: Terminate the iteration, and output precoding vectors and receive vectors that are obtained through the foregoing iterations.

Step 85: The transmitters perform precoding processing on transmit signals by using the obtained precoding vectors, and then send the precoded transmit signals.

Step 86: The receivers filter receive signals by using the corresponding receive vectors, and obtain desired signals.

Evidently, in this embodiment, precoding vectors and receive vectors may be obtained by using an iteration method; by using the precoding vectors and the receive vectors, some interference signals at the receivers can have a feature of a lattice constellation pattern, and some interference signals at the receivers are canceled. In this way, problems caused when all interference signals adopt a single interference alignment manner at the receivers may be avoided, and the system performance is improved.

Figure 10:
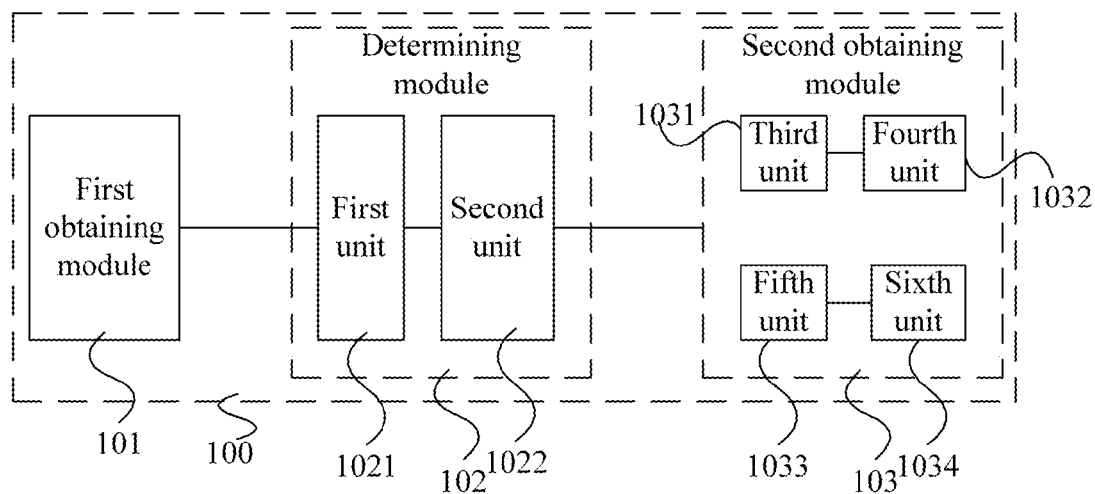
FIG. 10 is a schematic structural diagram of an interference alignment device according to Embodiment 4 of the present invention.

FIG. 10 is a schematic structural diagram of an interference alignment device according to Embodiment 4 of the present invention. The interference alignment device 100 includes a first obtaining module 101, a determining module 102, and a second obtaining module 103.

The first obtaining module 101 is configured to obtain channel matrixes in a multi-channel communication system, where the channel matrixes are represented by H and include channel matrixes where different transmitters correspond to different receivers in the multi-channel communication system.

The determining module 102 is configured to determine a first desired signal and a second desired signal of the multi-channel communication system according to the channel matrixes, where interference alignment is implemented for the first desired signal by using a lattice construction manner and interference alignment is implemented for the second desired signal by using a beamforming manner.

It should be noted that the first desired signal and the second desired signal represent two different types of desired signals. Specifically, one type of desired signal, that is, the first desired signal, uses a lattice construction manner for interference alignment, and the other type of desired signal, that is, the second desired signal, uses a beamforming manner for interference alignment. It is understandable that each type of desired signal may include one or more desired signals, and that a specific quantity is determined according to actual applications.

The second obtaining module 103 is configured to obtain precoding vectors and receive vectors, so that at a receiver corresponding to the first desired signal, after a first receive signal is filtered by a receive vector corresponding to the first desired signal, a signal formed by superposing interference signals included therein has a feature of a lattice constellation pattern, and that at a receiver corresponding to the second desired signal, after a second receive signal is filtered by a receive vector corresponding to the second desired signal, interference signals included therein are canceled, where the first receive signal and the second receive signal are transmit signals sent to the corresponding receivers after precoding processing is performed at transmitters by using corresponding precoding vectors. The manner of obtaining precoding vectors and receive vectors may include: determining relative equivalent channel gains of each interference signal corresponding to each first desired signal, and setting relative equivalent channel gains of interference signals corresponding to each second desired signal to zero; and determining precoding vectors and receive vectors according to the channel matrixes and the relative equivalent channel gains of the interference signals corresponding to each first desired signal and each second desired signal.

The determining module 102 may include a first unit 1021 and a second unit 1022, where: the first unit 1021 is configured to calculate, according to the channel matrixes, sum rates that can be implemented under different combinations of first desired signals and second desired signals; and the second unit 1022 is configured to select a first desired signal and a second desired signal corresponding to a maximum sum rate under different combinations of first desired signals and second desired signals as a first desired signal and a second desired signal of the multi-channel communication system.

In an implementation manner, the second obtaining module 103 may include a third unit 1031 and a fourth unit 1032, where: the third unit 1031 is configured to determine relative equivalent channel gains of each interference signal corresponding to each first desired signal, and set relative equivalent channel gains of interference signals corresponding to each second desired signal to zero; and the fourth unit 1032 is configured to determine, according to the channel matrixes and the relative equivalent channel gains of the interference signals corresponding to each first desired signal and each second desired signal, the precoding vectors and the receive vectors by using an analytical method.

Further, the fourth unit 1032 may be specifically configured to: calculate precoding vectors by using a reduced-order constraint equation, where the reduced-order constraint equation includes precoding vectors to be calculated, the relative equivalent channel gains of the interference signals corresponding to each first desired signal and each second desired signal, and the channel matrixes; and calculate receive vectors by using a constraint equation, where the constraint equation includes receive vectors to be calculated, the calculated precoding vectors, the relative equivalent channel gains of the interference signals corresponding to each first desired signal and each second desired signal, and the channel matrixes.

In another implementation manner, the second obtaining module 103 includes a fifth unit 1033 and a sixth unit 1034, where: the third unit 1033 is configured to determine relative equivalent channel gains of each interference signal corresponding to each first desired signal, and set relative equivalent channel gains of interface signals corresponding to each second desired signal to zero; and the sixth unit 1034 is configured to determine, according to the channel matrixes and the relative equivalent channel gains of the interference signals corresponding to each first desired signal and each second desired signal, the precoding vectors and the receive vectors by using an iteration method.

Further, the sixth unit 1034 is specifically configured to: calculate precoding vectors by using an optimization method, by using receive vectors generated at random as initial values of input of an iteration and using a sum of power of interference that interference signals impose on desired signals at a receiver as an optimization goal or by using a ratio of a sum of strength of desired signals to a sum of power of interference that interference signals impose on desired signals at the receiver as an optimization goal, where the sum of power of interference that interference signals impose on desired signals at the receiver or the ratio of the sum of strength of desired signals to the sum of power of interference that interference signals impose on desired signals at the receiver is generated according to the relative equivalent channel gains of the interference signals corresponding to each first desired signal and each second desired signal and the channel matrixes; calculate, according to the calculated precoding vectors, receive vectors by using a maximum signal-to-noise ratio as an optimization goal or by using an MMSE method, and use the receive vectors as input of a next iteration, where the signal-to-noise ratio is generated according to the channel matrixes and the relative equivalent channel gains of the interference signals corresponding to each first desired signal and each second desired signal; and repeat the foregoing steps until the preset number of iterations is reached, and obtain precoding vectors and receive vectors after the iteration.

For details about the working principles and working processes of each module or unit in this embodiment, reference may be made to the descriptions of the method in the foregoing embodiments, which is not further described here.

Evidently, by obtaining precoding vectors and receive vectors, the interference alignment device provided in this embodiment ensures that after a receive signal at a receiver corresponding to a first desired signal is filtered, interference signals therein have a feature of a lattice constellation pattern and that after a receive signal at a receiver corresponding to a second desired signal is filtered, interference signals therein are canceled. In this way, the advantages of two prior arts may be combined and their disadvantages may be avoided to achieve optimal system performance.

In this embodiment of the present invention, two interference alignment methods in the prior art are combined; on the basis of interference alignment in the first prior art, users are selected on an adaptive basis according to the channel conditions to perform signal construction; precoding is performed at the transmitters, and power of the transmitters is adjusted. In this way, signals formed by superposing all interference signals of filtered receive signals can form a lattice constellation pattern, and desired signal information corresponding to each lattice point is unique. In addition, the distance between lattice points is greater than or equal to the Euclidean distance between constellation points of desired signals under an interference-free condition, so that desired signals can be effectively detected and that impacts of interference can be reduced.

After the system implements interference alignment, if desired signals are strongly correlated with interference signals, interference may be canceled by setting $q_{ij}$ to zero, but this may reduce the receive power of the desired signals and reduce the receive signal-to-nose ratios of the desired signals. If a method for forming a lattice at the receivers is used, interference is still superposed with the desired signals after the signals are filtered by the receive vectors, but lattice points are formed (each lattice point includes unique desired signal information). Therefore, the desired signals may be detected without reducing the power of the desired signals, and the system performance is improved.

Figure 11:
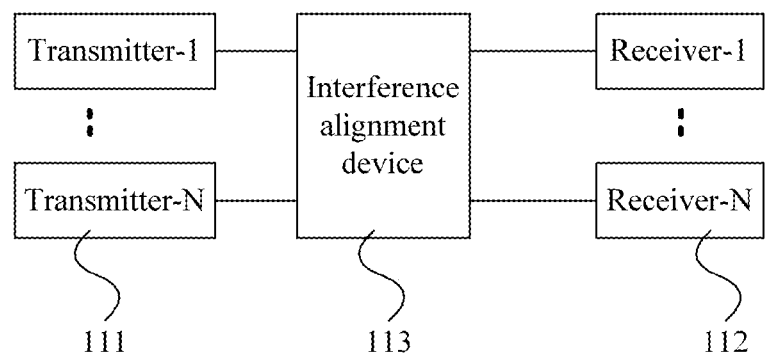
FIG. 11 is a schematic structural diagram of a multi-channel communication system according to Embodiment 5 of the present invention.

FIG. 11 is a schematic structural diagram of a multi-channel communication system according to Embodiment 5 of the present invention, including at least two transmitters 111, at least two receivers 112, and an interference alignment device 113.

The interference alignment device 113 is configured to obtain precoding vectors and receive vectors, so that at a receiver end corresponding to a first desired signal, after a first receive signal is filtered by a receive vector corresponding to the first desired signal, a signal formed by superposing interference signals included therein has a feature of a lattice constellation pattern, and that at a receiver end corresponding to a second desired signal, after a second receive signal is filtered by a receive vector corresponding to a second desired signal, interference signals included therein are canceled, where interference alignment is implemented for the first desired signal by using a lattice construction mode and interference alignment is implemented for the second desired signal by using a beamforming manner.

The transmitters 111 are configured to perform precoding processing on transmit signals by using corresponding precoding vectors output by the interference alignment device 113 and send the precoded transmit signals to corresponding receivers. It should be noted that the signals may be sent by a transmitter-1 to a receiver-1 or sent by the transmitter-1 to all receivers.

The receivers 112 are configured to filter corresponding receive signals by using corresponding receive vectors output by the interference alignment device 113 and obtain desired signals.

FIG. 11 is based on an assumption that the interference alignment device 113 is arranged independently. The interference alignment device 113 may also be located inside a transmitter 111 or inside a receiver 112.

For details about the structure of the interference alignment device 113 in this embodiment, reference may be made to the device shown in FIG. 10.

An embodiment of the present invention provides a transmitter, including the interference alignment device in the foregoing embodiment and a transmitter configured to perform precoding processing on transmit signals by using precoding vectors output by the interference alignment device and send the transmit signals.

Evidently, in this embodiment, by ensuring that after a receive signal at a receiver corresponding to a first desired signal is filtered, interference signals therein have a feature of a lattice constellation pattern and that after a receive signal at a receiver corresponding to a second desired signal is filtered, interference signals therein are canceled. In this way, the advantages of two prior arts may be combined and their disadvantages may be avoided to achieve optimal system performance.

Figure 12:
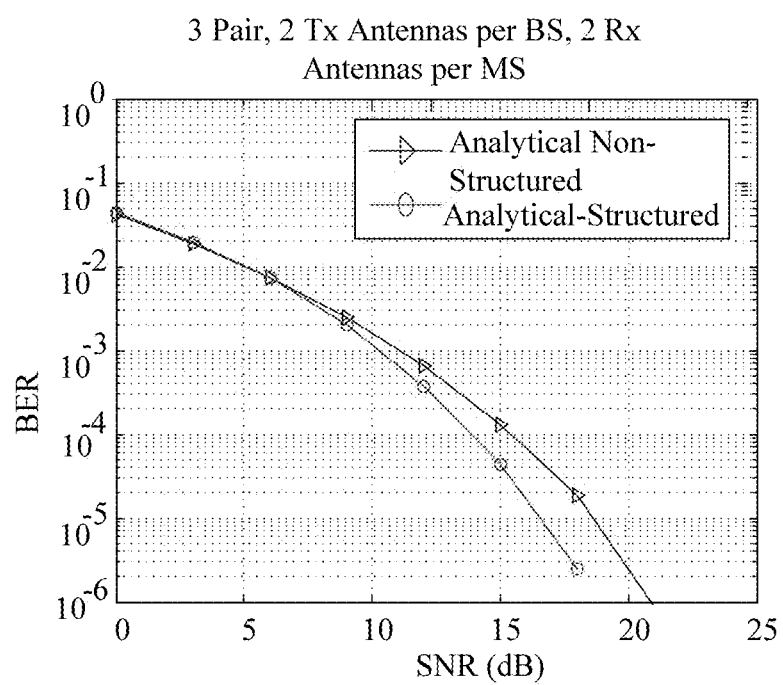
FIG. 12 is a schematic simulation diagram illustrating the comparison between an analytical method in an embodiment of the present invention and a first prior art using an analytical method.
Figure 13:
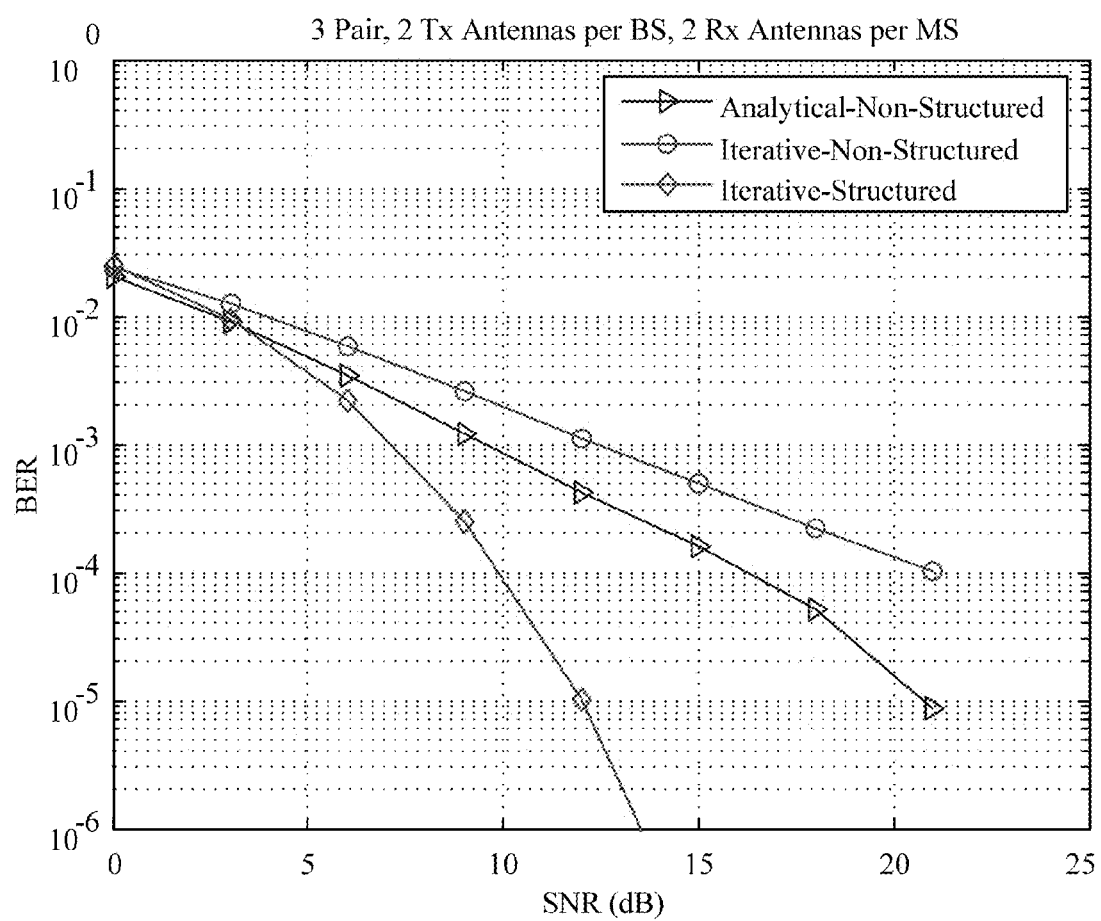
FIG. 13 is a schematic simulation diagram illustrating the comparison between an analytical method in an embodiment of the present invention and a first prior art using an analytical method and an iteration method.

By using the interference alignment implemented according to the foregoing principles, the system performance may be improved. For details, reference may be made to simulation diagrams shown in FIG. 12 and FIG. 13. The conditions of the simulation diagrams are as follows: three pairs of transmitters and receivers, with each transmitter and each receiver having two antennas. FIG. 12 is a schematic simulation diagram illustrating the comparison between an analytical method in an embodiment of the present invention and a first prior art using an analytical method, where the line with circles represents the analytical method in this embodiment of the present invention and the line with triangles represents the first prior art using the analytical method. FIG. 13 is a schematic simulation diagram illustrating the comparison between an analytical method in an embodiment of the present invention and a first prior art using an analytical method and an iteration method, where the line with diamonds represents the analytical method in this embodiment of the present invention, the line with triangles represents the first prior art using the analytical method, and the line with circles represents the first prior art using the iteration method.

In FIG. 12 and FIG. 13, the horizontal axis represents a signal-to-noise ratio (SNR) in units of decibels (dB), and the vertical axis represents a bit error ratio (BER). It may be seen from FIG. 12 and FIG. 13 that the BER in this embodiment of the present invention is relatively low at the same SNR and that the SNR needed by this embodiment of the present invention is relatively low at the same BER (that is, a same objective may be reached without the need of better conditions). Therefore, the system performance is better.

To sum up, in embodiments of the present invention, precoding vectors and receive vectors are obtained, so that after a first receive signal of a receiver corresponding to a first desired signal is filtered, a signal formed by superposing interference signals therein has a feature of a lattice constellation pattern, and that after a second receive signal of a receiver corresponding to a second desired signal is filtered, interference signals therein are canceled, that is, some receive signals are processed by using implementation principles in the first prior art, while some receive signals are processed by using implementation principles in the second prior art. Therefore, advantages of the two prior arts may be combined and their disadvantages may be avoided to achieve optimal system performance. Embodiments of the present invention provide an analytical method and an iteration method, which expand the application scope. The interference alignment device provided in an embodiment of the present invention may be arranged inside a transmitter or inside a receiver or be arranged independently, which makes the arrangement more flexible.

Persons of ordinary skill in the art may understand that all or part of the steps of the methods in the embodiments may be implemented by a program instructing relevant hardware. The program may be stored in a computer readable storage medium. When the program is run, the foregoing steps of the methods in the embodiments are performed. The storage medium may be any medium capable of storing program codes, such as read-only memory (ROM), random-access memory (RAM), magnetic disk, or optical disk, and the like.

Finally, it should be noted that the foregoing embodiments of the present invention are merely intended for describing the technical solutions of the present invention other than limiting the present invention.

What is claimed is:

1. An interference alignment method comprising:
obtaining a channel matrix in a multi-channel communication system;
determining a first desired signal and a second desired signal of the multi-channel communication system according to the channel matrix, wherein interference alignment is implemented for the first desired signal by using a lattice construction manner and interference alignment is implemented for the second desired signal by using a beamforming manner; and
obtaining precoding vectors and receive vectors such that at a receiver corresponding to the first desired signal, after a first receive signal is filtered by a receive vector corresponding to the first desired signal, a signal formed by superposing interference signals comprised therein has a feature of a lattice constellation pattern, and that at a receiver corresponding to the second desired signal, after a second receive signal is filtered by a receive vector corresponding to the second desired signal, interference signals comprised therein are canceled, wherein the first receive signal and the second receive signal are transmit signals sent to the corresponding receivers after precoding processing is performed at transmitters by using corresponding precoding vectors.

2. The method according to claim 1, wherein determining the first desired signal and the second desired signal of the multi-channel communication system according to the channel matrix comprises:
calculating, according to the channel matrix in the multi-channel communication system, sum rates that can be implemented under different combinations of first desired signals and second desired signals; and
selecting the first desired signal and the second desired signal corresponding to a maximum sum rate under different combinations of first desired signals and second desired signals as the first desired signal and the second desired signal of the multi-channel communication system.

3. The method according to claim 1, wherein the precoding vectors are used to encode transmit signals, wherein the transmit signals are modulated by using a quadrature amplitude modulation (QAM) manner, a quadrature phase shift keying (QPSK) manner, or a binary phase shift keying (BPSK) manner.

4. The method according to claim 1, wherein implementing interference alignment by using the lattice construction manner comprises, after interference signals are filtered by the receive vectors, superposing the interference signals in a same space direction or two orthogonal space directions such that the superposed interference signals have a feature of a lattice constellation pattern.

5. The method according to claim 1, wherein obtaining the precoding vectors and the receive vectors comprises:
determining relative equivalent channel gains of each interference signal corresponding to each first desired signal;
setting relative equivalent channel gains of interference signals corresponding to each second desired signal to zero; and
determining, according to the channel matrix and the relative equivalent channel gains of the interference signals corresponding to each first desired signal and each second desired signal, the precoding vectors and the receive vectors by using an analytical method.

6. The method according to claim 1, wherein obtaining the precoding vectors and the receive vectors comprises:
determining relative equivalent channel gains of each interference signal corresponding to each first desired signal;
setting relative equivalent channel gains of interference signals corresponding to each second desired signal to zero; and
determining, according to the channel matrix and the relative equivalent channel gains of the interference signals corresponding to each first desired signal and each second desired signal, the precoding vectors and the receive vectors by using an iteration method.

7. The method according to claim 5, wherein determining, according to the channel matrix and the relative equivalent channel gains of the interference signals corresponding to each first desired signal and each second desired signal, the precoding vectors and the receive vectors by using the analytical method comprises:
calculating the precoding vectors by using a reduced-order constraint equation, wherein the reduced-order constraint equation comprises the precoding vectors to be calculated, the channel matrix, and the relative equivalent channel gains of the interference signals corresponding to each first desired signal and each second desired signal; and
calculating the receive vectors by using a constraint equation, wherein the constraint equation comprises the receive vectors to be calculated, the calculated precoding vectors, the channel matrix, and the relative equivalent channel gains of the interference signals corresponding to each first desired signal and each second desired signal.

8. The method according to claim 6, wherein determining, according to the channel matrix and the relative equivalent channel gains of the interference signals corresponding to each first desired signal and each second desired signal, the precoding vectors and the receive vectors by using the iteration method comprises:
calculating the precoding vectors using an optimization method by using the receive vectors that are generated at random as initial values of input of an iteration and using a sum of power of interference that interference signals impose on desired signals at the receiver as an optimization goal or by using a ratio of a sum of strength of desired signals to a sum of power of interference that interference signals impose on desired signals at the receiver as an optimization goal, wherein the sum of power of interference that interference signals impose on desired signals at the receiver, or the ratio of the sum of power of desired signals to the sum of power of interference that interference signals impose on desired signals at the receiver, is generated according to the channel matrix and the relative equivalent channel gains of the interference signals corresponding to each first desired signal and each second desired signal;
calculating, according to the calculated precoding vectors, the receive vectors by using a maximum signal-to-noise ratio as an optimization goal or by using a minimum mean square estimation method, and using the receive vectors as input of a next iteration, wherein the signal-to-noise ratio is generated according to the channel matrix and the relative equivalent channel gains of the interference signals corresponding to each first desired signal and each second desired signal;
repeating above steps until a preset number of iterations is reached; and
obtaining the precoding vectors and the receive vectors after iteration.

9. An interference alignment device comprising:
a first obtaining module configured to obtain a channel matrix in a multi-channel communication system;
a determining module configured to determine a first desired signal and a second desired signal of the multi-channel communication system according to the channel matrix, wherein interference alignment is implemented for the first desired signal by using a lattice construction manner and interference alignment is implemented for the second desired signal by using a beamforming manner; and
a second obtaining module configured to obtain precoding vectors and receive vectors such that at a receiver corresponding to the first desired signal, after a first receive signal is filtered by a receive vector corresponding to the first desired signal, a signal formed by superposing interference signals comprised therein has a feature of a lattice constellation pattern, and that at a receiver corresponding to the second desired signal, after a second receive signal is filtered by a receive vector corresponding to the second desired signal, interference signals comprised therein are canceled, wherein the first receive signal and the second receive signal are transmit signals sent to the corresponding receivers after precoding processing is performed at transmitters by using corresponding precoding vectors.

10. The device according to claim 9, wherein the determining module comprises:
a first unit configured to calculate, according to the channel matrix in the multi-channel communication system, sum rates that can be implemented under different combinations of first desired signals and second desired signals; and
a second unit configured to select the first desired signal and the second desired signal corresponding to a maximum sum rate under different combinations of first desired signals and second desired signals as the first desired signal and the second desired signal of the multi-channel communication system.

11. The device according to claim 9, wherein the second obtaining module comprises:
a third unit configured to determine relative equivalent channel gains of each interference signal corresponding to each first desired signal, and set relative equivalent channel gains of interference signals corresponding to each second desired signal to zero; and
a fourth unit configured to determine, according to the channel matrix and the relative equivalent channel gains of the interference signals corresponding to each first desired signal and each second desired signal, the precoding vectors and the receive vectors by using an analytical method.

12. The device according to claim 9, wherein the second obtaining module comprises:
a fifth unit configured to determine relative equivalent channel gains of each interference signal corresponding to each first desired signal, and set relative equivalent channel gains of interference signals corresponding to each second desired signal to zero; and
a sixth unit configured to determine, according to the channel matrix and the relative equivalent channel gains of the interference signals corresponding to each first desired signal and each second desired signal, the precoding vectors and the receive vectors by using an iteration method.

13. The device according to claim 11, wherein the fourth unit is specifically configured to:
calculate the precoding vectors by using a reduced-order constraint equation, wherein the reduced-order constraint equation comprises the precoding vectors to be calculated, the relative equivalent channel gains of the interference signals corresponding to each first desired signal and each second desired signal, and the channel matrix; and
calculate the receive vectors by using a constraint equation, wherein the constraint equation comprises the receive vectors to be calculated, the calculated precoding vectors, the relative equivalent channel gains of the interference signals corresponding to each first desired signal and each second desired signal, and the channel matrix.

14. The device according to claim 12, wherein the sixth unit is specifically configured to:
calculate the precoding vectors using an optimization method by using the receive vectors that are generated at random as initial values of input of an iteration and using a sum of power of interference that interference signals impose on desired signals at the receiver as an optimization goal, or by using a ratio of a sum of strength of desired signals to a sum of power of interference that interference signals impose on desired signals at the receiver as an optimization goal, wherein the sum of power of interference that interference signals impose on desired signals at the receiver, or the ratio of the sum of strength of desired signals to the sum of power of interference that interference signals impose on desired signals at the receiver, is generated according to the channel matrix and the relative equivalent channel gains of the interference signals corresponding to each first desired signal and each second desired signal;
calculate, according to the calculated precoding vectors, the receive vectors by using a maximum signal-to-noise ratio as an optimization goal or by using a minimum mean square estimation method, and use the receive vectors as input of a next iteration, wherein the signal-to-noise ratio is generated according to the channel matrix and the relative equivalent channel gains of the interference signals corresponding to each first desired signal and each second desired signal;
repeat above steps until a preset number of iterations is reached; and
obtain the precoding vectors and the receive vectors after the iteration.

15. A transmitter comprising:
an interference alignment device; and
a transmitter configured to perform precoding processing on transmit signals by using precoding vectors output by the interference alignment device and send the precoded transmit signals,
wherein the interference alignment device comprises a first obtaining module, a determining module, and a second obtaining module,
wherein the first obtaining module is configured to obtain a channel matrix in a multi-channel communication system,
wherein the determining module is configured to determine a first desired signal and a second desired signal of the multi-channel communication system according to the channel matrix, wherein interference alignment is implemented for the first desired signal by using a lattice construction manner and interference alignment is implemented for the second desired signal by using a beamforming manner; and wherein the second obtaining module is configured to obtain the precoding vectors and the receive vectors such that at a receiver corresponding to the first desired signal, after a first receive signal is filtered by a receive vector corresponding to the first desired signal, a signal formed by superposing interference signals comprised therein has a feature of a lattice constellation pattern, and that at a receiver corresponding to the second desired signal, after a second receive signal is filtered by a receive vector corresponding to the second desired signal, interference signals comprised therein are canceled, wherein the first receive signal and the second receive signal are transmit signals sent to the corresponding receivers after precoding processing is performed at the transmitter.

16. A multi-channel communication system comprising:
at least two receivers;
at least two transmitters; and
an interference alignment device,
wherein the interference alignment device is configured to obtain precoding vectors and receive vectors such that at a receiver corresponding to a first desired signal, after a first receive signal is filtered by a receive vector corresponding to the first desired signal, a signal formed by superposing interference signals comprised therein has a feature of a lattice constellation pattern, and that at a receiver end corresponding to a second desired signal, after a second receive signal is filtered by a receive vector corresponding to the second desired signal, interference signals comprised therein are canceled, wherein interference alignment is implemented for the first desired signal by using a lattice construction manner and interference alignment is implemented for the second desired signal by using a beamforming manner, wherein the transmitters are configured to perform precoding processing on transmit signals by using the precoding vectors output by the interference alignment device and send the precoded transmit signals to corresponding receivers, and wherein the receivers are configured to filter corresponding receive signals by using the receive vectors output by the interference alignment device and obtain desired signals.

17. The system according to claim 16, wherein the interference alignment device is located in the transmitters or in the receivers or is arranged independently.

\* \* \* \* \*